US008954300B2

(12) United States Patent  
Scoullar et al.

(10) Patent No.: US 8,954,300 B2  
(45) Date of Patent: *Feb. 10, 2015

(54) SCREENING METHOD AND APPARATUS

(75) Inventors: Paul Andrew Basil Scoullar, Fitzroy North (AU); Robin John Evans, Aspendale (AU); Christopher Charles McLean, Kangaroo Flat (AU)

(73) Assignee: Southern Innovation International Pty Ltd., Victoria (AU)

( * ) Notice: Subject to any disclaimer, the term of this patent is extended or adjusted under 35 U.S.C. 154(b) by 985 days.

This patent is subject to a terminal disclaimer.

(21) Appl. No.: 12/935,586

(22) PCT Filed: Mar. 31, 2009

(86) PCT No.: PCT/AU2009/000393  
§ 371 (c)(1),  
(2), (4) Date: Sep. 30, 2010

(87) PCT Pub. No.: WO2009/121130  
PCT Pub. Date: Oct. 8, 2009

(65) Prior Publication Data  
US 2011/0035197 A1 Feb. 10, 2011

Related U.S. Application Data

(60) Provisional application No. 61/041,163, filed on Mar. 31, 2008, provisional application No. 61/138,879, filed on Dec. 18, 2008.

(51) Int. Cl.  
*G06F 7/60* (2006.01)  
*G06F 17/10* (2006.01)  
(Continued)

(52) U.S. Cl.  
CPC ............ *G01V 5/0016* (2013.01); *G01T 1/171* (2013.01)

USPC .......................................................... 703/2

(58) Field of Classification Search  
None  
See application file for complete search history.

(56) References Cited

U.S. PATENT DOCUMENTS 4,658,216 A 4/1987 Goulding et al.  
5,210,423 A 5/1993 Arseneau  
(Continued)

FOREIGN PATENT DOCUMENTS

CN 101666227 3/2010  
EP 1579202 B1 4/2007  
(Continued)

OTHER PUBLICATIONS

Buffler, A., Contraband detection with fast neutrons, Radiat Phys Chem. (2004) 71: 853-861.

(Continued)

*Primary Examiner* — Saif Alhija  
(74) *Attorney, Agent, or Firm* — Knobbe, Martens, Olson & Bear, LLP

(57) ABSTRACT

A screening method and apparatus, the method comprising irradiating a subject for screening with excitation radiation, collecting detector output data from a radiation detector located near the subject, and resolving individual signals in the detector output data by (i) determining a signal form of signals present in the data, (ii) making parameter estimates of one or more parameters of the signals, wherein the one or more parameters comprise at least a signal temporal position, and (iii) determining the energy of each of the signals from at least the signal form and the parameter estimates. The screening time is shorter, dwell time is shorter, resolution is improved and/or throughput is increased.

20 Claims, 23 Drawing Sheets

(51) Int. Cl.
*G01V 5/00* (2006.01)
*G01T 1/17* (2006.01)

(56) References Cited

U.S. PATENT DOCUMENTS

| | | | |
|---|---|---|---|
| 5,225,682 | A | 7/1993 | Britton et al. |
| 5,349,193 | A | 9/1994 | Mott et al. |
| 5,349,195 | A | 9/1994 | Dumont |
| 5,532,944 | A | 7/1996 | Battista |
| 5,884,234 | A | 3/1999 | Jorion et al. |
| 6,057,551 | A | 5/2000 | Tararine |
| 6,160,259 | A | 12/2000 | Petrillo et al. |
| 6,215,122 | B1 | 4/2001 | Clifford et al. |
| 6,590,957 | B1 | 7/2003 | Warburton et al. |
| 7,139,350 | B2 | 11/2006 | Tiller et al. |
| 7,439,515 | B2 | 10/2008 | Bak |
| 7,725,281 | B2 | 5/2010 | Jordanov |
| 7,763,859 | B2 | 7/2010 | Mott |
| 7,817,762 | B2 | 10/2010 | Johnstone et al. |
| 7,999,220 | B2 | 8/2011 | Odom |
| 2003/0165212 | A1 | 9/2003 | Maglich |
| 2005/0040334 | A1 | 2/2005 | Beyerle |
| 2006/0157655 | A1* | 7/2006 | Mammone et al. ........... 250/395 |
| 2006/0284100 | A1 | 12/2006 | Bak |
| 2010/0074397 | A1 | 3/2010 | Kappler et al. |
| 2010/0270473 | A1 | 10/2010 | Kraft et al. |

FOREIGN PATENT DOCUMENTS

| | | |
|---|---|---|
| JP | 10186041 | 7/1998 |
| JP | 2001337168 | 12/2001 |
| JP | 3836629 B2 | 10/2006 |
| JP | 3907910 B2 | 4/2007 |
| JP | 3980451 B2 | 9/2007 |
| JP | 2009229127 | 10/2009 |
| JP | 4358814 B2 | 11/2009 |
| JP | 4706566 B2 | 6/2011 |
| JP | 4787989 B2 | 10/2011 |
| KR | 20110120015 | 11/2011 |
| WO | WO 94/28438 | 12/1994 |
| WO | WO 97/07591 | 2/1997 |
| WO | WO 99/58999 | 11/1999 |
| WO | WO 00/39600 | 7/2000 |
| WO | WO 02/097471 | 12/2002 |
| WO | WO 03/040757 | 5/2003 |
| WO | WO 2005/121835 | 12/2005 |
| WO | WO 2005/121988 | 12/2005 |
| WO | WO 2006/029475 | 3/2006 |
| WO | WO 2007/049168 | 5/2007 |
| WO | WO 2007/146350 | 12/2007 |
| WO | WO 2008/089014 | 7/2008 |
| WO | WO 2008/155679 | 12/2008 |
| WO | WO 2009/020863 | 2/2009 |
| WO | WO 2009/020866 | 2/2009 |
| WO | WO 2009/032452 | 3/2009 |
| WO | WO 2009/050619 | 4/2009 |
| WO | WO 2009/059312 | 5/2009 |
| WO | WO 2009/076256 | 6/2009 |
| WO | WO 2010/014576 | 2/2010 |
| WO | WO 2011/002452 | 1/2011 |
| WO | WO 2011/023431 | 3/2011 |
| WO | WO 2011/039312 | 4/2011 |
| WO | WO 2012/029496 | 3/2012 |
| WO | WO 2012/088781 | 7/2012 |

OTHER PUBLICATIONS

Golub et al., Matrix Computations, The Johns Hopkins University Press, (1989), $2^{nd}$ Ed.—TOC only.

Haykin, S., Adaptive Filter Theory, Pearson Prentice Hall (2002), $4^{th}$ Ed.— TOC only.

Meng et al., An Inter-comparison of Three Spectral-Deconvolution Algorithms for Gamma-ray Spectroscopy, IEEE Transact Nucl Science (Aug. 2000) 47(4): 1329-1336.

International Search Report dated May 13, 2009 for Application No. PCT/AU2009/000393, filed Mar. 31, 2009.

International Preliminary Report on Patentability dated Oct. 5, 2010 and Written Opinion for Application No. PCT/AU2009/000393, filed Mar. 31, 2009.

* cited by examiner

SCREENING METHOD AND APPARATUS

RELATED APPLICATION

This application is based on and claims the benefit of the filing date of U.S. application No. 61/041,163 filed 31 Mar. 2008 and of U.S. application No. 61/138,879 filed 18 Dec. 2008, the contents of which as filed are incorporated herein by reference in their entirety.

FIELD OF THE INVENTION

The present invention relates generally to a screening method and apparatus, of particular but by no means exclusive application in monitoring cargo and other goods, vehicles and vessels, explosives and suspicious objects.

BACKGROUND OF THE INVENTION

The number of screening techniques for inspecting cargo and luggage, principally for reasons of security, has increased in recent times. One recently proposed technique, for example, is disclosed in EP 1579202, and comprises a sealed-tube or similar generator for producing substantially mono-energetic fast neutrons produced via the D-T or D-D reactions, a source of X-rays or gamma-rays for penetrating an object, a collimating block surrounding the neutron and gamma-ray sources, apart from slots for emitting fan-shaped radiation beams, and a detector array.

One existing system employs a pulsed-neutron elemental analysis detector, and allows the screening of a sample or object—such as whether it comprises or contains an explosive—after a data collection period of about 10 minutes. While this may be acceptable for screening a small number of items, it becomes prohibitive for large quantities of cargo.

Such techniques may be employed to screen a truck, and in such cases are provided in the form of a screening portal in which the truck is parked. Port Technology International (published by Maritime Information Services Ltd) published a cost-benefit analysis of cargo screening in September 2006, which demonstrated that, assuming a fixed-site cargo screening station operating at 20 containers/h, the equipment related costs of screening were US$23.49 per container.

SUMMARY OF THE INVENTION

According to a first aspect of the invention, therefore, there is provided a screening method, comprising:
  irradiating a subject for screening with excitation radiation;
  collecting detector output data from a radiation detector located near the subject; and
  resolving individual signals in the detector output data by (i) determining a signal form (or an impulse response) of signals present in said data, (ii) making parameter estimates of one or more parameters of said signals, wherein said one or more parameters comprise at least a signal temporal position, and (iii) determining the energy of each of said signals from at least said signal form and said parameter estimates;
  whereby the screening time is shorter, dwell time (i.e. irradiation and/or data collection time) is shorter, resolution is improved and/or throughput is increased.

Thus, this method endeavors to characterize as much data as possible, but it will be appreciated that it may not be possible to adequately characterize some data (which hence is termed 'corrupt data'), as is described below. It will be understood that the term 'signal' is interchangeable in this context with 'pulse', as it refers to the output corresponding to individual detection events rather than the overall output signal comprising the sum of individual signals. It will also be appreciated that the temporal position (or timing) of a signal can be measured or expressed in various ways, such as according to the time (or position in the time axis) of the maximum of the signal or the leading edge of the signal. Typically this is described as the arrival time ('time of arrival') or detection time.

It will also be understood that the term 'detector data' refers to data that has originated from a detector, whether processed subsequently by associated or other electronics within or outside the detector.

The method may include constructing a model of the data from the parameter estimates, and determining the accuracy of the parameter estimates based on a comparison between the detector output data and the model.

In certain embodiments, the resolving of individual signals comprises:
  obtaining the detector output data as digitized detector output data in a form of a digital time series; and
  forming a mathematical model based on the digital time series and as a function of at least the signal form, the temporal position of the signals, and the amplitude of the signals;
  wherein determining the energy of each of the signals comprises determining the amplitude of the signals based on the mathematical model, the amplitude being indicative of a radiation event.

The signal form (or impulse response) may be determined by a calibration process that involves measuring the detector's time domain response to one or more single event detections to derive from that data the signal form or impulse response. A functional form of this signal form may then be obtained by interpolating the data with (or fitting to the data) a suitable function such as a polynomial, exponential or spline. A filter (such as an inverse filter) may then be constructed from this detector signal form. An initial estimate of signal parameters may be made by convolution of the output data from the detector with the filter. Signal parameters of particular interest include the number of signals and the temporal position (or time of arrival) of each of the signals.

The particular signal parameters of interest can then be further refined. Firstly, the estimate of the number and arrival times of signals is refined with the application of peak detection and a threshold. Secondly, knowledge of the number of signals and their arrival time, coupled with the detector impulse response (and hence signal form), makes it possible to solve for the energy parameters of the signals.

The accuracy of the parameter estimation can be determined or 'validated' by comparing a model (in effect, an estimate) of the detector data stream (constructed from the signal parameters and knowledge of the detector impulse response) and the actual detector output. Should this validation process determine that some parameters are insufficiently accurate, these parameters are discarded. In spectroscopic analysis using this method, the energy parameters deemed sufficiently accurate may be represented as a histogram.

The method may include making the estimates of signal parameters in accordance with the signal form (i.e. the impulse response of the detector used for generating the signal). The method may include determining the signal form by a calibration process including measuring the response of the detector to one or more single detections to derive a data based model of the signal form. In particular, the method may include obtaining a functional form of the model by interpolating the data with a function to generate the expected signal form. The function may be a polynomial, exponential or spline function.

The method may include designing a filter on the basis of the predetermined form of the individual signals produced by the radiation detector. The filter may be, for example, of matched filter or inverse filter form.

In one embodiment, the method includes using convolution of the detector output and filter to make an initial estimate of the signal parameters. The method may include refining the estimate of the signal parameters. The method may include refining the estimate of signal number with a peak detection process. The method may include making or refining the estimate of signal temporal position by application of a peak detection process. The method may include, refining the estimate of signal energy by solving a system of linear equations, by matrix inversion or by iterative techniques.

In an embodiment of the invention, the method includes creating a model of the detector output using the signal parameters in combination with the detector impulse response. The method may include performing error detection by, for example, comparing the actual detector output data with the model of the detector output, such as by using least-squares or some other measure of the difference between the data and the model.

The method may include discarding parameters deemed not sufficiently accurately estimated.

In one embodiment, the method includes presenting all sufficiently accurate energy parameters in a histogram.

The data may include signals of different forms. In this case, the method may include determining where possible the signal form of each of the signals.

In one embodiment, the method includes progressively subtracting from the data those signals that acceptably conform to successive signal forms of a plurality of signal forms, and rejecting those signals that do not acceptably conform to any of the plurality of signal forms.

The method may be characterized by an incident flux on said radiation detector of gamma-rays of interest of 75 kHz or more.

The method may be characterized by an incident flux on said radiation detector of gamma-rays of 80 kHz or more.

The method may be characterized by a data throughput of greater than 90% for an input count rate of 50 kHz.

The method may be characterized by a data throughput of greater than 90% for input count rates between 25 and 250 kHz.

The method may be characterized by a data throughput of greater than 95% for an input count rate of 25 kHz.

The method may be characterized by a data throughput of greater than 95% for input count rates between 25 and 100 kHz.

The method may be characterized by a data throughput of greater than 80% for an input count rate of 250 kHz.

The method may be characterized by a data throughput of greater than 50% for input count rates between 250 and 2500 kHz.

In a second aspect, the invention provides a screening apparatus, comprising:
 a radiation source for irradiating a subject to be screened;
 a radiation detector for detecting radiation emitted by the subject, and for outputting detector data in response thereto; and
 a processor for receiving the detector data in digitized form, and programmed to determine the signal form of each of the signals present in the data, to make parameter estimates of one or more parameters of the signals, and to determine the energy of each of the signals from at least the signal form and the parameter estimates, wherein the one or more parameters comprise at least a signal temporal position;
 whereby the screening time is shorter, dwell time is shorter, resolution is improved and/or throughput is increased.

The processor may be programmed to obtain the detector output data in a form of a digital time series and to form a mathematical model based on the digital time series and as a function of the signal form, the temporal position of the signals, and an amplitude of the signals, wherein determining the energy of each of the signals comprises determining the amplitude of the signals based on the mathematical model, the amplitude being indicative of a radiation event.

The radiation source and radiation detector may be located adjacently such that the radiation detector detects reflected or back-scattered radiation from the subject.

In one embodiment, the radiation source and radiation detector are separated or separable so that the radiation detector detects transmitted or forward-scattered radiation from the subject.

In one embodiment, the apparatus comprises a cargo screening apparatus. In another embodiment, the apparatus comprises an explosives detection apparatus. In another embodiment, the apparatus comprises a container screening apparatus or a screening portal.

The apparatus may be characterized by an incident flux on said radiation detector of gamma-rays of interest of 75 kHz or more.

The apparatus may be characterized by a data throughput of greater than 90% for an input count rate of 50 kHz.

The apparatus may be characterized by a data throughput of greater than 90% for input count rates between 25 and 250 kHz.

The apparatus may be characterized by a data throughput of greater than 95% for an input count rate of 25 kHz.

The apparatus may be characterized by a data throughput of greater than 95% for input count rates between 25 and 100 kHz.

The apparatus may be characterized by a data throughput of greater than 80% for en input count rate of 250 kHz.

The apparatus may be characterized by a data throughput of greater than 50% for input count rates between 250 and 2500 kHz.

In a third aspect, the invention provides a method for screening for a chemical element in an object or objects, comprising:
 collecting detector output data from a radiation detector of a screening apparatus;
 resolving individual signals in the detector output data by (i) determining a signal form of signals present in said data, (ii) making parameter estimates of one or mare parameters of said signals, wherein said one or more parameters comprise at least a signal temporal position, and (iii) determining the energy of each of said signals from at least said signal form and said parameter estimates; and
 determining a quantity of the element from at least those of the signals arising from instances of the element in the object or objects;
 whereby the screening time is shorter, dwell time is shorter, resolution is improved and/or throughput is increased.

The resolving of individual signals may comprise:
 obtaining said detector output data as digitized detector output data in a form of a digital time series; and forming a mathematical model based on the digital time series and as a function of at least the signal form, the temporal position of the signals, and the amplitude of the signals;

wherein determining the energy of each of said signals comprises determining the amplitude of said signals based on said mathematical model, the amplitude being indicative of a radiation event.

In a fourth aspect, the invention provides a screening method, comprising:

irradiating a subject for screening with excitation radiation;

collecting detector output data from a radiation detector located near the subject; and resolving individual signals in the detector output data by (i) obtaining or expressing the detector output data as a digital series, (ii) obtaining or determining a signal form of signals present in the data, (iii) forming a transformed signal form by transforming the signal form according to a mathematical transform, (iv) forming a transformed series by transforming the digital series according to the mathematical transform, the transformed series comprising transformed signals, (v) evaluating a function of at least the transformed series and the transformed signal form and thereby providing a function output, (vi) modelling the function output according to a model, (vii) determining at least one parameter of the function output based on the model, and (viii) determining a parameter of the signals from the at least one determined parameter of the function output;

whereby the screening time is shorter, dwell time is shorter, resolution is improved and/or throughput is increased.

In a fifth aspect, the invention provides a screening apparatus, comprising:

a radiation source for irradiating a subject to be screened;
a radiation detector for detecting radiation emitted by the subject, and for outputting detector data in response thereto; and a processor for receiving the detector data as a digital series, and programmed to (i) obtain or determine a signal form of signals present in the data, (ii) form a transformed signal form by transforming the signal form according to a mathematical transform, (iii) form a transformed series by transforming the digital series according to the mathematical transform, said transformed series comprising transformed signals, (iv) evaluate a function of at least the transformed series and the transformed signal form and thereby provide a function output, (v) model the function output according to a model, (vi) determine at least one parameter of the function output based on the model, and (vii) determine a parameter of the signals from the at least one determined parameter of the function output;

whereby the screening time is shorter, dwell time is shorter, resolution is improved and/or throughput is increased.

In a sixth aspect, the invention provides a method for screening for a chemical element in an object or objects, comprising:

collecting detector output data from a radiation detector of a screening apparatus;

resolving individual signals in the detector output data by (i) obtaining or expressing the detector output data as a digital series, (ii) obtaining or determining a signal form of signals present in the data, (iii) forming a transformed signal form by transforming the signal form according to a mathematical transform, (iv) forming a transformed series by transforming the digital series according to the mathematical transform, said transformed series comprising transformed signals, (v) evaluating a function of at least the transformed series and the transformed signal form and thereby providing a function output, (vi) modelling the function output according to a model, (vii) determining at least one parameter of the function output based on the model, and (viii) determining a parameter of the signals from the at least one determined parameter of the function output;

determining a quantity of the element from at least those of the signals arising from instances of the element in the object or objects;

whereby the screening time is shorter, dwell time is shorter, resolution is improved and/or throughput is increased.

It should be noted that the various optional features of each aspect of the invention may be employed where suitable and desired with any of the other aspects of the invention.

BRIEF DESCRIPTION OF THE DRAWINGS

In order that the invention may be more clearly ascertained, preferred embodiments will now be described, by way of example only, with reference to the accompanying drawing, in which.

DETAILED DESCRIPTION OF THE EMBODIMENTS

Figure 1:
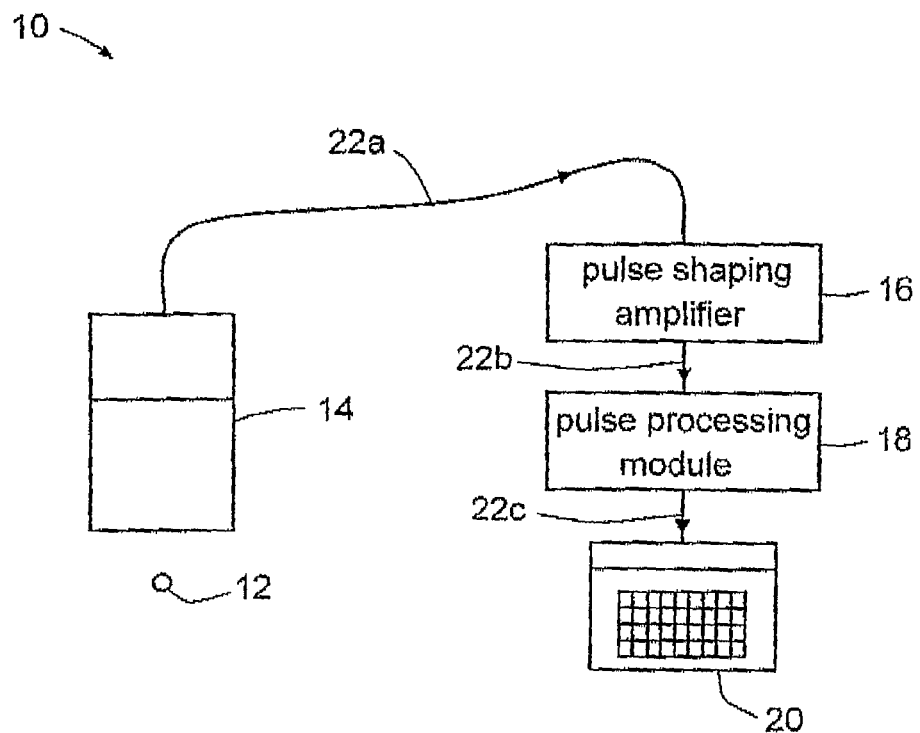
FIG. 1 is a schematic view of an explosives detection apparatus according to an embodiment of the present invention.

FIG. 1 is a schematic view of an explosives detection apparatus 10 according to a first embodiment of the present invention, with an item 12 to be screened. Apparatus 10 includes a pulsed-neutron elemental analysis detector 14, comprising a neutron generator that can emit both thermal and pulsed neutrons and a BGO scintillation detector for generating a spectrum of gamma-ray energies (from which the chemical composition of item 12 can be determined).

Apparatus 10 also includes a pulse shaping amplifier 16, a pulse processing module 18 and a data storage laptop computer 20, as well as coaxial cable 22a connecting the output of pulsed-neutron elemental analysis detector 14 to pulse shaping amplifier 16, a data cable 22b connecting the output of pulse shaping amplifier 16 to the Analogue Front End of pulse processing module 18, and a data cable 22c connecting the output of pulse processing module 18 to computer 20.

Pulse processing module 18 includes a signal processing unit that comprises two parts: 1) an analog to digital converter which produces a digital output corresponding to the analog output of the detector unit, and 2) a processing unit which implements digital signal processing (DSP) routines, described below, in accordance with the present invention.

Apparatus 10 is typically employed to detect explosives, by determining the chemical composition of item 12 according to gamma-ray spectra collected With apparatus 10. Tests of apparatus 10 (described below) suggest that raw count rates as high as twice what is currently acceptable in comparable system can be employed without excessively high pulse pile-up, and thus quicker screening can be performed. It is therefore expected that, if apparatus 10 (or a comparable apparatus according to the present invention) were deployed in a screening portal, container screening throughput could be increased to at least 40 containers/h, equaling what has been said to be the target scanning rate of the next generation of cargo scanners. Port Technology International's analysis (referred to above) concluded that increasing the container screening throughput to 50 containers/h was estimated to lower this cost to US$9.40 per container so, even with the current generation of detectors, sources and other equipment, it is envisaged that apparatus 10 will provide considerable cost savings.

If next-generation container screening facilities achieve 40 containers/h without the present invention, it is envisaged that—augmented according to the present invention—such facilities might achieve container screening throughput of up to 80 containers/h, reducing cost per-container still further.

Figure 2:
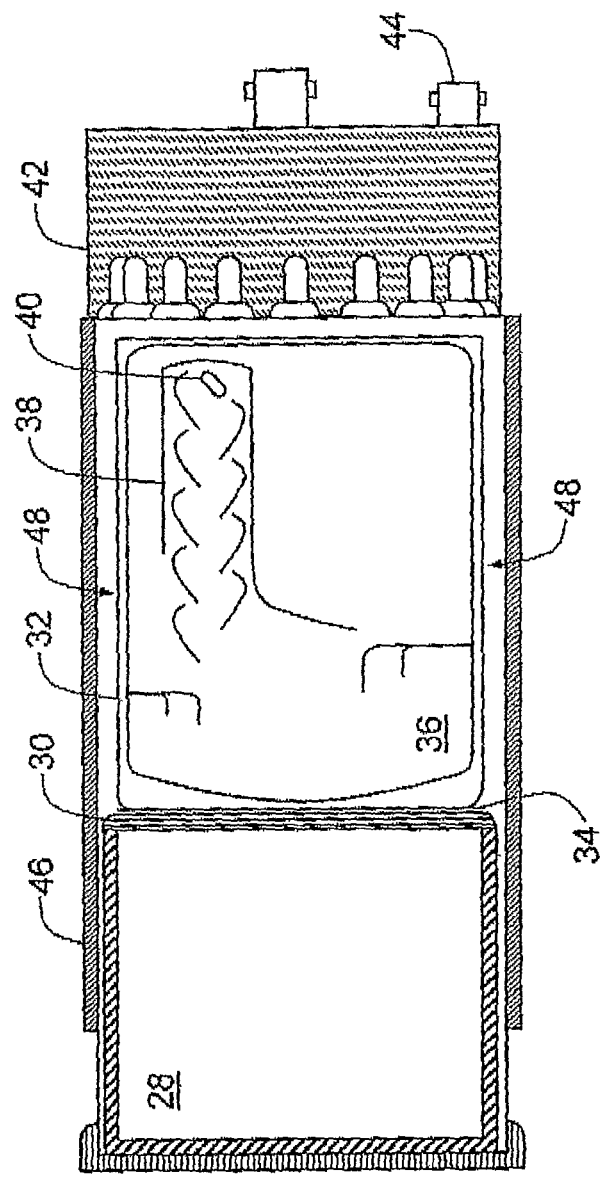
FIG. 2 is a view of the scintillation gamma-ray detector of the apparatus of FIG. 1.

FIG. 2 is a schematic view of BGO scintillation detector 24 of detector 14. When a gamma-ray is emitted by an atom in item 12, having been excited by neutrons from neutron source 14, it may pass into the BGO scintillation detector 24 and, if so, its energy is transferred from the gamma-ray to electrons within scintillator crystal 28. Upon the emission of ultra-violet photons the electrons lose this energy, promoting electrons within the crystal to excited states. Upon the emission of ultra-violet photons the electrons decay to lower energy states. The aforementioned ultra-violet photons pass through the optical window to the photocathode 36 of the photomultiplier tube 32 where they are converted into photoelectrons and subsequently multiplied by an electron multiplier 38 before arriving at the anode 40 of the photomultiplier tube 32. A further multiplication stage may be provided by an on-board pre-amplifier 42. In this manner an electrical signal, whose amplitude is proportional to the energy of the incident gamma-rays, is present at the detector output terminals 44 of the detector 24. It will also be appreciated that the detector 24 may additionally include a mu metal magnetic shield 46 located about the sides 48 of photomultiplier tube 32 and extending forwardly of the photomultiplier tube 32 sufficiently far to surround a portion of crystal 28.

Scintillation detectors of this kind have high efficiencies, that is, exhibit a high probability of detecting an incident gamma-ray. However, they also exhibit a relatively long detector response time. The detector response time is the time required by the detector to detect an incident gamma-ray and return to a state where the next incident gamma-ray can be accurately detected. Radiation detectors with long detector response times are thus prone to pulse pile-up. That is, the output, which ideally consists of completely discrete pulses each corresponding to the incidence of a single gamma-ray, instead exhibits a waveform in which individual pulses can overlap making them difficult to characterize.

Figure 3A:
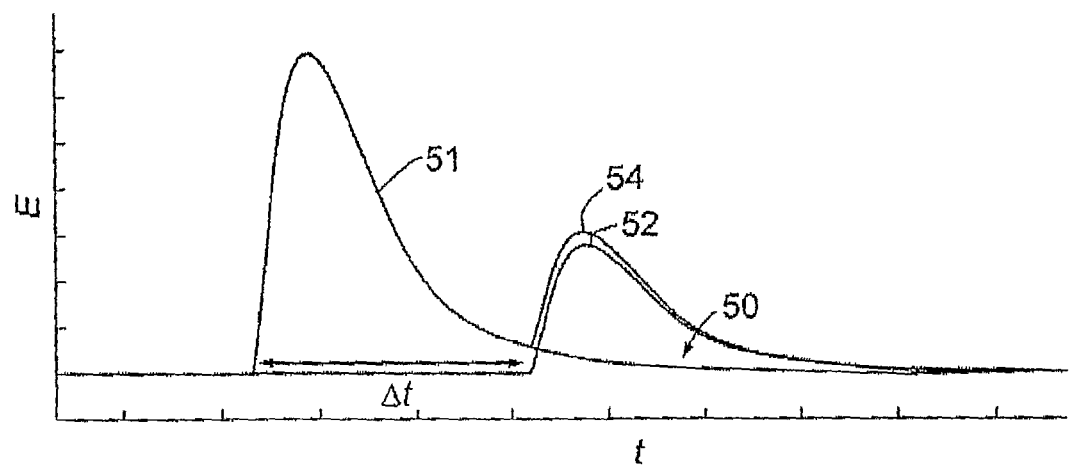
FIGS. 3a, 3b and 3c are graphs illustrating pulse pile-up.
Figure 3B:
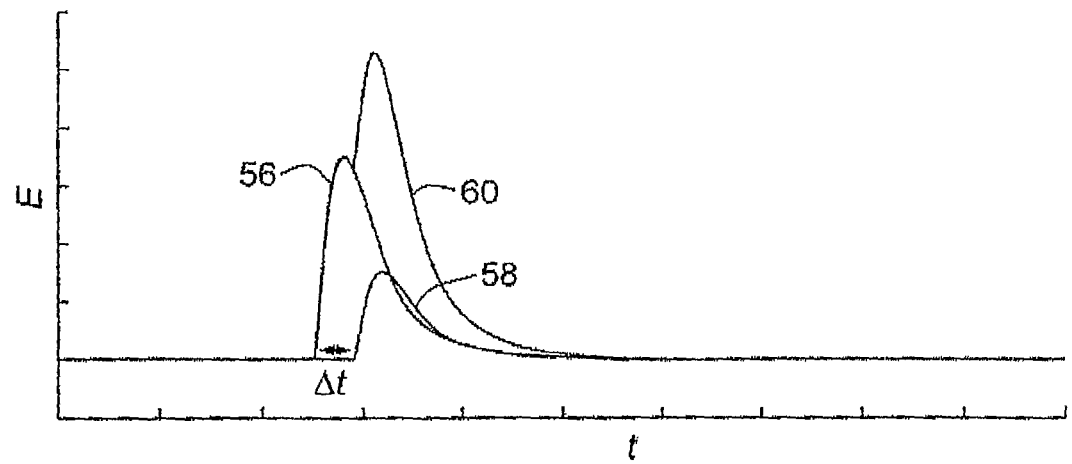
Figure 3C:
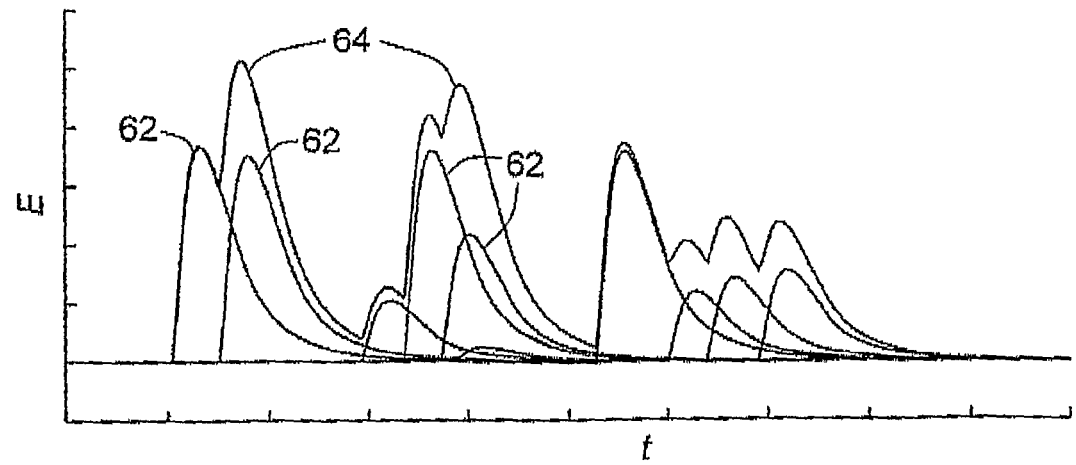

FIGS. 3a, 3b and 3c illustrate the effect of pulse pile-up, and show illustrative signals or pulses plotted as energy E versus time t (both in arbitrary units). FIG. 3a illustrates so-called 'tail-end pile-up' where, depending on the type of pulse conditioning employed, the tail 50 of one pulse 51 can provide a significant positive or negative bias positive in the illustrated example to the amplitude of a subsequent pulse 52. Although the time displacement between the two pulses, Δt, is relatively large when compared with the overall time interval for which the pulses prevail, the signal envelope or resultant waveform 54 is significantly above zero at the arrival of the second pulse 52.

The absence of a true zero signal state between the two pulses corrupts the pulse characterization, as the amplitude of the second pulse is falsely inflated by the tail of the first. FIG. 3b illustrates another form of pulse pile-up, 'peak pile-up'. Here two pulses 56 and 58 arrive closely spaced in time i.e. the time displacement Δt between the pulses is small compared with the overall time interval over which the pulses prevail. The resultant output waveform 60 appears more or less as a single pulse of somewhat greater amplitude than either of the component pulses. In situations where the flux of gamma-rays through the detector is extreme, it is not uncommon to have multiple events arriving within the response time of the detector leading to multiple pile-up events. Such a case is illustrated by FIG. 3c. Multiple signals or pulses (such as those shown at 62) arrive with random time separation Δt and sum to produce a resultant waveform 64 from which the parameters of the component signals are difficult to extract.

One component of the method of addressing pulse pile-up according to this embodiment is the estimation of certain parameters of the signals or pulses; these parameters are the number, time-of-arrival and energy of all gamma-rays in the detector data stream. These parameters are estimated, according to this embodiment, by modeling the signals in the data stream mathematically. The model employed in this embodiment includes certain assumptions about the data and the apparatus, as are discussed below.

Figure 4:
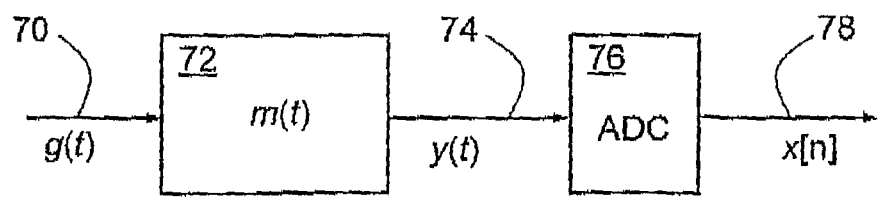
FIG. 4 is a diagram illustrating the mathematical modeling of radiation detection used by the signal processing method embodied in the apparatus of FIG. 1.

FIG. 4 is a diagram that illustrates the modeling of the radiation detection process. The radiation g(t) 70 is incident on the detector 72 represented by the measurement process m(t), resulting in output data from the detector y(t) 74. The addition of a sampling process 76 produces the digital detector data or 'time-series' x[n] 78.

Figure 5:
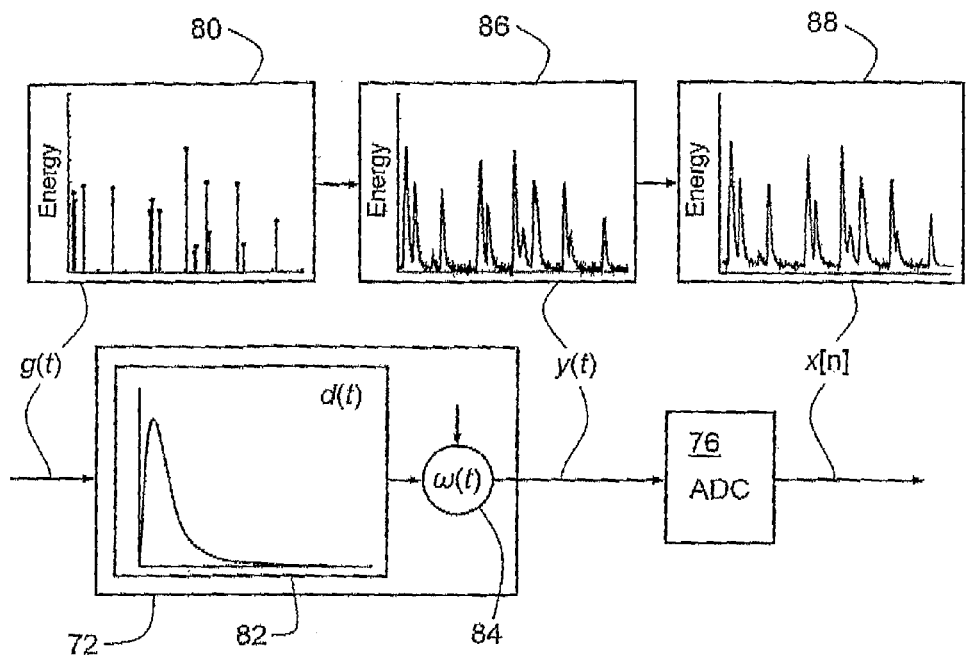
FIG. 5 is a diagram detailing the mathematical model of radiation detection used by the signal processing method embodied in the apparatus of FIG. 1.

It is possible to add to the above-described model some knowledge about the physical processes of radiation detection. FIG. 5 illustrates a more detailed mathematical model of the detection process shown in FIG. 4. The input g(t) to the detector is characterized by Equation 1, in which the input g(t) is assumed to be an unknown number (N) of delta-function-like impulses of random amplitude (α) and time of arrival (τ). An illustrative example of such input is shown at 80.

$$g(t) = \sum_{i=1}^{N} \alpha_i \delta(t - \tau_i) \ i = 1, 2, 3, \ldots, N. \quad (1)$$

The radiation detector is assumed to have a specific response to the incoming radiation, referred to as the detector impulse response d(t) (or, equivalently, the signal form of the signals in the data), which is illustrated at 82. The digitized version of the detector impulse response (i.e. signal form) is denoted d[n].

The output from the detector is shown at 86 and characterized by Equation 2, in which the detector output y(t) is the sum of an unknown number of signals of predetermined signal form d(t), with unknown energy (α) and unknown time of arrival (τ). Sources of random noise ω(t) 84 are also considered. The digital detector data x[n] 88 is produced by the analog to digital converter 76.

$$y(t) = \sum_{i=1}^{N} \alpha_i d(t - \tau_i) + \omega(t) \ i = 1, 2, 3, \ldots, N. \quad (2)$$

The digitized signal x[n] (which constitutes a time series of data) at the output of the analog to digital converter 76, as illustrated at 88, is therefore given by $$x[n] = \sum_{i=1}^{N} \alpha_i d[n - \Delta_i] + \omega[n], \quad (3)$$

where d[n] is the discrete time form of the signal form d(t), $\Delta_i$ is the delay in samples to the ith signal, and ω[n] is the discrete time form of the noise. The digitized signal x[n] may also be written in matrix form as $$x = A\alpha + \omega, \quad (4)$$

where A is an M×N matrix, the entries of which are given by $$A(n, i) = \begin{cases} d[n - \Delta_i] & \Delta_i \le n < \min(M, \Delta_i + T - 1) \\ 0 & \text{otherwise.} \end{cases} \quad (5)$$

Also, T is the length of d[n] in samples, M is the total number of samples in the digitized signal x[n], α is the vector of N signal energies, and ω is the noise vector of length M. Matrix A may also be depicted as follows:

$$A = \begin{bmatrix} 0 & 0 & \cdots & 0 \\ \vdots & & & \\ 0 & \vdots & & \\ d[1] & & & \vdots \\ d[2] & 0 & & \\ \vdots & d[1] & & \\ d[T] & & & \\ 0 & \vdots & \ddots & 0 \\ & & & d[1] \\ \vdots & d[T] & & d[2] \\ & & & \vdots \\ 0 & \cdots & 0 & d[r < T] \end{bmatrix} \begin{matrix} \\ \\ \leftarrow \text{row } \Delta_1 \\ \\ \leftarrow \text{row } \Delta_2 \\ \\ \\ \\ \leftarrow \text{row } \Delta_N. \\ \\ \\ \end{matrix}$$

Thus, the columns of matrix A contain multiple versions of the signal form. For each of the individual columns the starting point of the signal form is defined by the signal temporal position. For example, if the signals in the data arrive at positions 2, 40, 78 and 125, column 1 of matrix A will have '0' in the first row, the 1st datum point of the signal form in the second row, the 2nd datum point of the signal form in the 3rd row, etc. The second column will have '0' up to row 39 followed by the signal form. The third column will have '0' up to row 77; the fourth column will have '0' up to row 124 and then the signal form. Hence the size of matrix A is determined by the number of identified signals (which becomes the number of columns), while the number of rows depends on the number of samples in the time series.

The signal processing method of this embodiment thus endeavors to provide an accurate estimate of some unknown parameters of the detector data, including not only the number of component signals (N) in the detector output but also the energy ($\alpha$) and time-of-arrival ($\tau$) of each of the component signals.

Signal Processing Method

Figure 6:
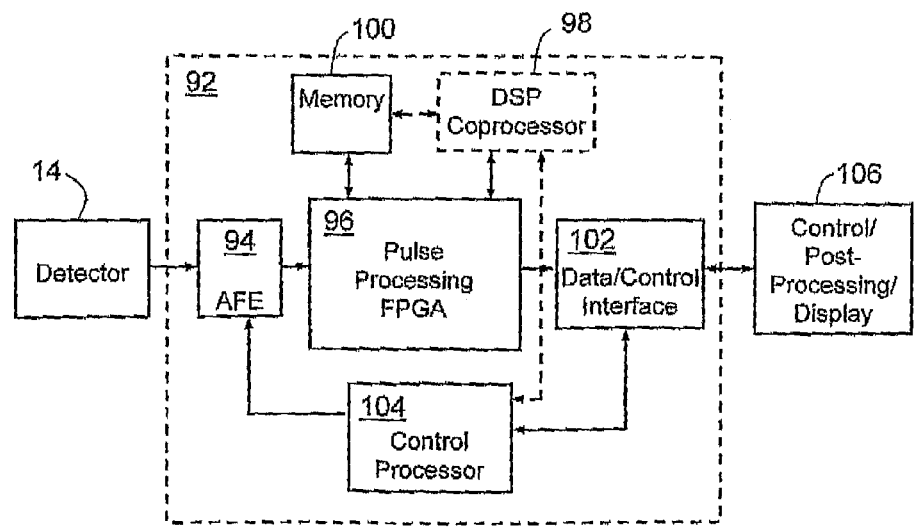
FIG. 6 is a schematic diagram of the functional elements of the data capture module of FIG. 1.

FIG. 6 is a schematic diagram of the functional elements of pulse processing module 18 of FIG. 1, with BGO scintillation detector 24, and is provided to explain in more detail the signal processing method for pulse pile-up recovery employed by the apparatus of FIG. 1. Referring to FIG. 6, BGO scintillation detector 24 is connected to a pulse processing board 92 (of pulse processing module 18) via an analog front end (AFE 94). The purpose of the AFE 94 is to digitize the signal produced by detector 16 by performing analog to digital conversion at, in this embodiment, 125 MHz with 12-bit conversion accuracy.

Figure 7A:
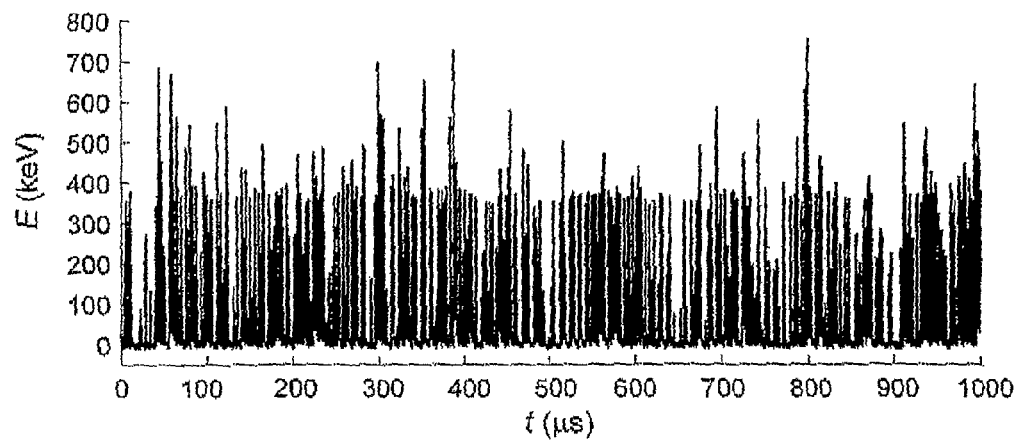
FIGS. 7a, 7b and 7c are plots of unprocessed digitized data collected directly from the output of the detector of FIG. 2 over time ranges of 1000 μs, 100 μs and 10 μs respectively.
Figure 7B:
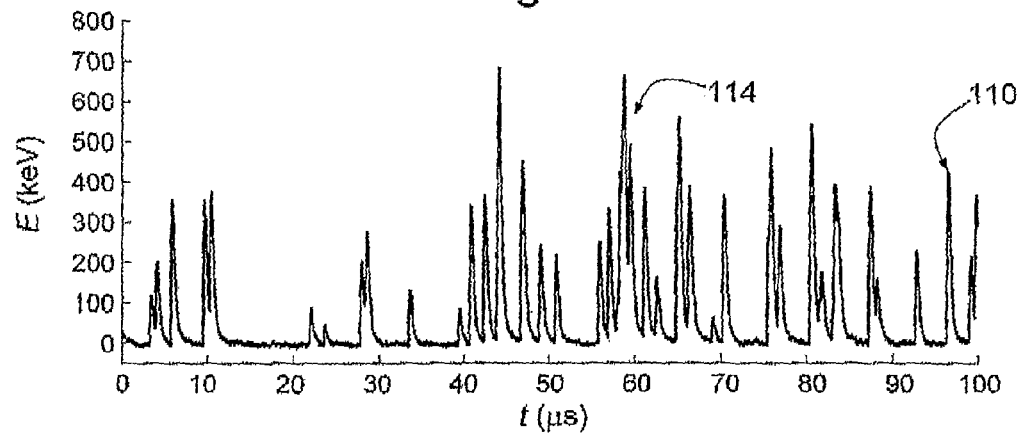
Figure 7C:
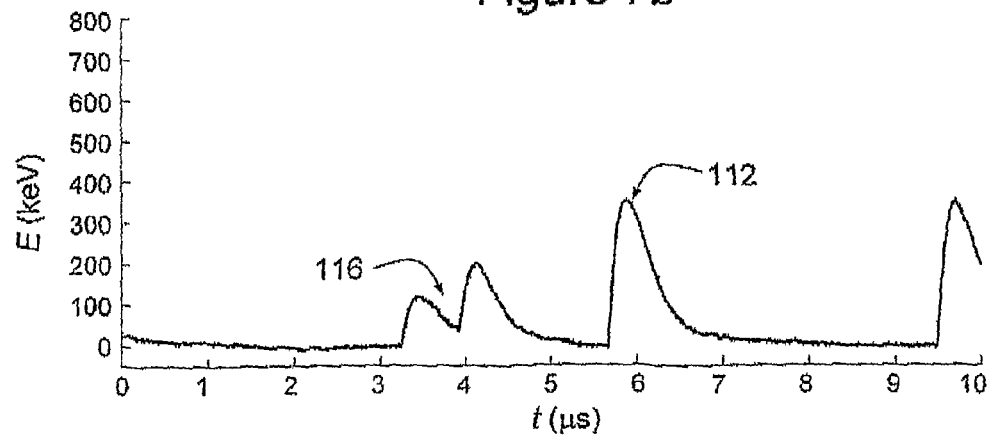

FIGS. 7a, 7b and 7c illustrate the waveform resulting from such digitization, over time ranges of 1000 microseconds, 100 microseconds and 10 microseconds respectively. The various peaks in these figures correspond to the detection of respective gamma-rays. Some peaks appear as discreet signals or pulses 110, 112 which may indicate the presence of only a single gamma-ray. Other peaks are clue to the pile-up either of two peaks 116 or of three or more peaks 114.

After the output of detector 16 has been digitized by AFE 94, the signal processing method for pulse pile-up recovery is implemented. Referring again to FIG. 6, the digital signal produced by AFE 94 is passed into the pulse processing Field Programmable Gate Array (FPGA) 96. The pulse processing FPGA (96) then implements the pulse processing method of this embodiment; a digital signal processing coprocessor 98 may optionally be used to assist the pulse processing FPGA 96 to implement the pulse processing method. Variables required by the pulse processing FPGA 96 and data produced at interim steps of the pulse processing method are optionally stored in memory 100. The signal processing is controlled via a Data/Control interface 102 which, in conjunction with a Control Processor 104, can be used to modify the implementation of the signal processing. The output data from the signal processing method can be displayed on a display 106 via the Data/Control Interface 102. Display 106 is provided in a computer that may, if desired, be used to perform post-processing and system control.

Figure 8:
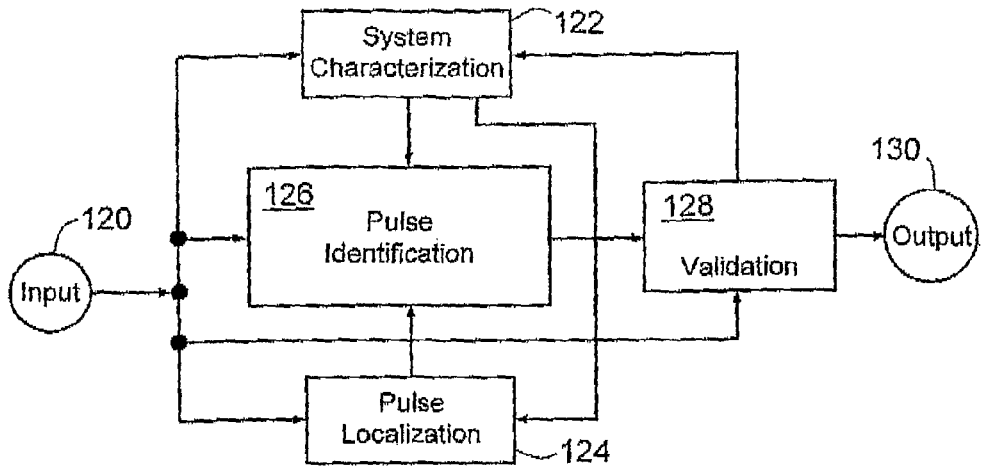
FIG. 8 is a schematic representation of the signal processing method for pulse pile-up recovery employed by the apparatus of FIG. 1 for analyzing spectroscopic data according to this embodiment of the invention.

FIG. 8 is a schematic diagram of the signal processing method for pulse pile-up recovery of radiation signals in the detector time series of this embodiment. The digitized detector signal (from AFE 94) forms the input 120 for this signal processing method. Offline System Characterization 122 is used to determine the detector impulse response unique to the particular digitized detector signal. Characterization data generated in System Characterization phase 122 is used in a Pulse Localization phase 124. The Pulse Localization phase 124 estimates, in real-time, the number and temporal position (or time-of-arrival) of radiation pulses within the digitized detector signal. In a Pulse Identification phase 126, the digitized detector signal, the detector impulse response and the output from the Pulse Localization phase 124 are used to determine the energy of the signals or pulses. Validation 128 involves comparing the output of the Pulse Identification phase 126 with the digitized detector signal 120. If this comparison indicates that any of the pulse parameters have been estimated inaccurately, those parameters are rejected so that only valid data is output 130. The error signal generated in the Validation phase 128 is also employed in System Characterization 122. In circumstances where the detector impulse response may change over time, such as owing to the aging of components, temperature variations or increased radiation fluxes, System Characterization 122 updates the detector impulse response online and adaptively by employing the error signal. Such updating of the detector impulse response may be performed with any suitable adaptive method, such as least mean squares adaptation, normalized least mean squares adaptation or recursive least squares adaptation as described, for example, by S. Haykin [*Adaptive Filter Theory*, 4th Ed, Prentice Hall, 2002].

Figure 9:
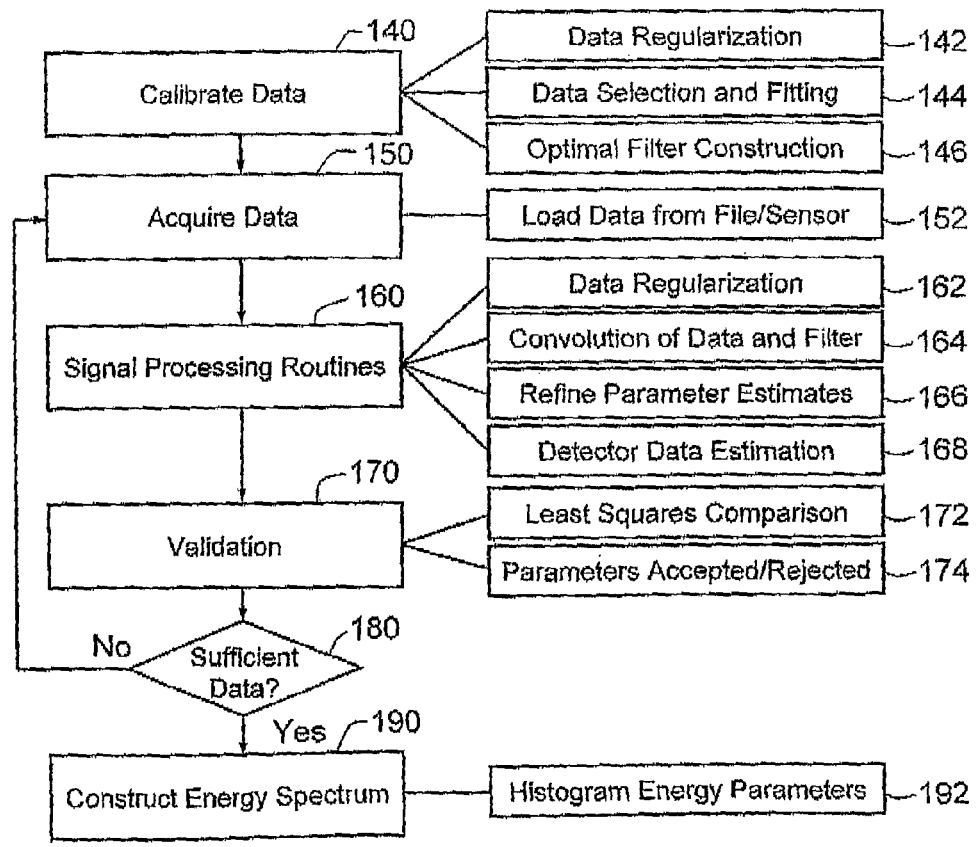
FIG. 9 is a schematic flowchart of the signal processing method for pulse pile-up recovery employed by the apparatus of FIG. 1 for analyzing spectroscopic data according to this embodiment of the invention.

FIG. 9 is a flow diagram of the signal processing method of this embodiment. At step 140, calibration is performed. This involves Data Regularization or Conditioning 142, Data Selection and Fitting 144 and Optimal Filter Construction 146. In Data Regularization 142, calibration data signals recorded at a low incident radiation flux are loaded from data files, the integrity of these calibration data is checked and any bias in the baseline of the data removed. Data Selection and Fitting 144 involves selecting only that data corresponding to the detection of single radiation events and constructing a data based model of the detector impulse response. A functional form of this model is then obtained by fitting a suitable function to the data, such as a polynomial, exponential or spline function. This results in the expected impulse response of the detector d[n]. Optimal Filter Construction 146 employs this detector impulse response to construct a suitable filter for the detector, such as an inverse filter or a matched filter.

At step 150 data is acquired, but may be affected by significant pulse pile-up. The data may be input 152 either from a file or directly from the detector elements 16.

At step 160 signal processing routines are applied to determine the amplitude and timing parameters of the signals in the time series. Firstly the data is conditioned 162 to remove any bias in the baseline of the data. Next, the detector data is convoluted 164 with the filter derived in step 146 to provide an initial estimate of the time-of-arrival parameters ($\tau$) and number of pulses (N). The timing parameters and estimate of the number of pulses are then further refined 166 using a suitable peak detection process, and the energy parameter ($\alpha$) is determined from $\tau$, N and the detector impulse response d[n] (such as by linear programming, matrix inversion or convolution techniques). Finally, from the number (N), energy ($\alpha$), timing ($\Delta_t$) and detector impulse response (d[n]), an estimate of the detector data stream ($\hat{x}[n]$) is made 168.

The parameter vector ($\alpha$) may be determined by linear programming or by solving the system of linear equations defined in Equation 4 using a suitable method for solving such systems of equations, such as one of those described, for example, by G. H. Golub and C. F. Van Loan [*Matrix Computations*, 2nd Ed, Johns Hopkins University Press, 1989].

At step (170) the validation phase 128 referred to above is performed, which may be referred to as error checking as, in this embodiment, validation involves determining an error signal e[n], computed successively for the set of samples corresponding to each signal i where 1<i<N (N being the total number of signals in the data stream). This error signal is calculated by determining 172 the squares of the differences between the time series data x[n] and the model based datastream ($\hat{x}[n]$ from step 168); e[n] is thus the square of the difference between x[n] and $\hat{x}[n]$, as given in Equation 6.

$$e[n]=(x[n]-\hat{x}[n])^2 \quad (6)$$

if e[n] exceeds a predetermined threshold, these parameters are rejected 174 as this condition indicates that the signal parameters do not produce a model of the respective signal that acceptably conforms to that signal (that is, is sufficiently accurate); the relevant signal is deemed to constitute corrupted data and excluded from further spectroscopic analysis. The threshold may be varied according to the data and how closely it is desired that the data be modeled; generally, therefore, in any particular specific application, the method of validation and definition of the threshold are chosen to reflect the requirements of that application.

One example of such a threshold is the signal energy $\alpha_i$ multiplied by a suitable factor, such as 0.05. Validation will, in this example, deem that the model acceptably conforms to the data constituting signal i when:

$$e[n] < 0.05\alpha_i \tag{7}$$

Validation may be performed by defining the error signal and threshold in any other suitable way. For example, the error signal may be set to the absolute value of the error. The threshold may be defined to be a multiple other than 0.05 of the signal amplitude. Another threshold comprises a number of noise, standard deviations.

Decreasing the threshold (such as by decreasing the coefficient of $\alpha_i$ in Equation 7) enables improved energy resolution at lower throughput, while increasing the threshold enables improved throughput at reduced energy resolution.

At step 180 a decision is made as to whether there is sufficient data. If not, processing continues at step 150. Otherwise, the method proceeds to step 190. At step 190 a gamma-ray energy spectrum is created. The gamma-ray energy parameters determined at step 166, which were deemed to be of sufficient accuracy at step 174, are represented 192 in the form of a histogram. This is the gamma-ray energy spectrum on which spectroscopic analysis may be performed.

Results of Processing Method

Figure 10A:
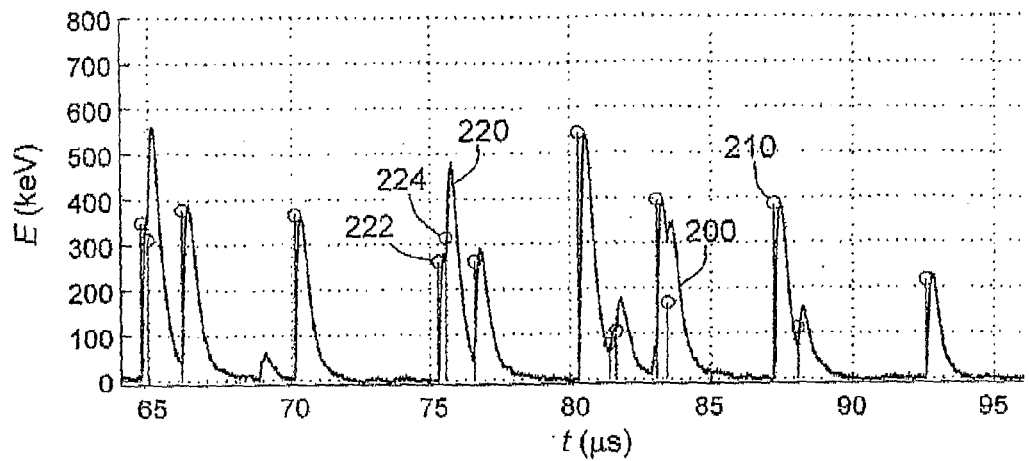
FIGS. 10a, 10b and 10c are plots of the results at different stages of the signal processing method of FIG. 9.
Figure 10B:
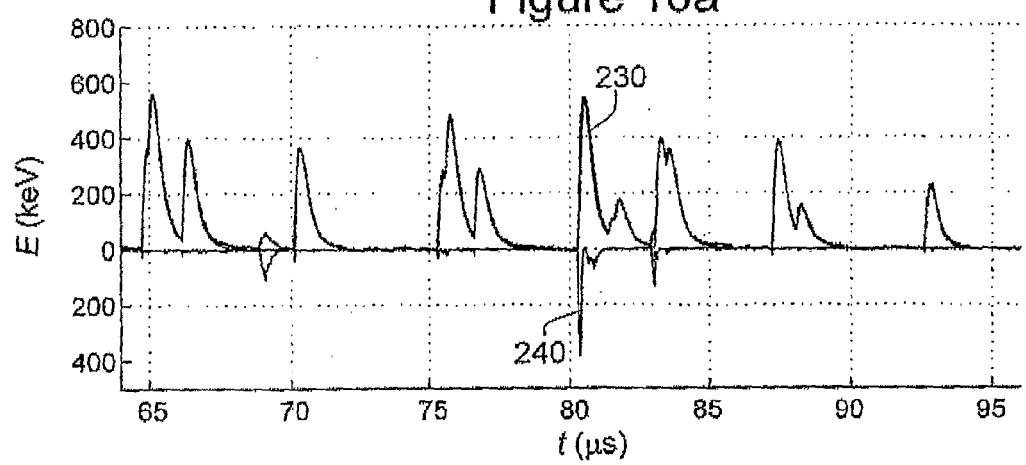
Figure 10C:
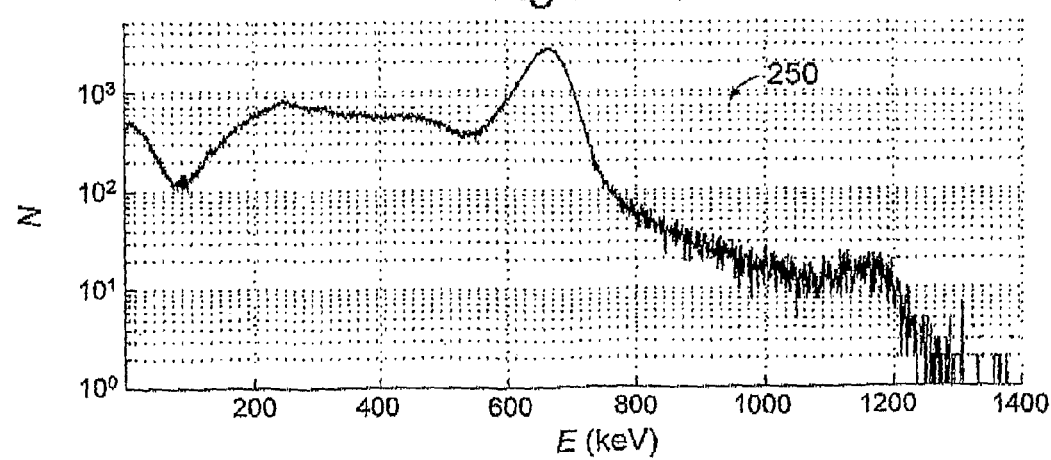

FIGS. 10a, 10b and 10c are plots of the results at various stages of processing of the digital signal processing method described above by reference to FIGS. 8 and 9, for digitized data collected with a scintillation gamma-ray detector. The detector data stream was digitized by an analog to digital converter at 125 MHz and 12 bit accuracy; the gamma-ray source used was a 137Cs source with a primary gamma-ray emission of 661.7 keV.

Scintillation detectors employ light generated by the detector/radiation interaction to detect and measure that incident radiation. A scintillation detector may comprise organic scintillators or inorganic scintillators. Organic scintillators include both organic crystalline scintillators and liquid organic solutions (where the scintillating material has been dissolved to form a liquid scintillator, which can then be plasticized to form a plastic scintillator. Inorganic scintillators include crystalline scintillators such as NaI(TI), BGO, CsI(TI) and many others, and photo switch detectors (in which a combination of two or more dissimilar scintillators are optically coupled to a common PMT to exploit the differing decay times of the scintillators to determine where a radiation/detection interaction has occurred).

In this example the detector comprised a 76 mm×76 mm NaI(TI) gamma-ray scintillation detector. FIG. 10a is a plot of a portion of the digitized detector data 200 prior to processing by the signal processing method plotted as energy E(keV) versus time t(μs), together with the results (for example, at 210) of the signal processing method plotted in terms of the temporal position and energy of the component signals. For example, what may appear to be a single peak 220 in the original digitized detector data 200 at approximately 75.8 μs has been resolved into two distinct signals 222, 224 at respectively 75.3 and 75.7 μs.

From the determined temporal positions, energies and forms of the signals it is possible to generate a model of the detector data. FIG. 10b is a plot of the resulting data model 230, shown as energy E(keV) versus time t(μs), of that portion of the digitized detector data stream 200 shown in FIG. 10a. An inverted error plot 240, comprising a plot of the squares of the differences between the detector data 200 and the data model 230, is also shown, and indicates the error in the model 230. The error signal is small where the model 230 has tracked the output of the detector accurately, but the error becomes large when there are inconsistencies between the model 230 of the detector data and the detector data 200 itself. Based on this error signal 240, a decision can be made as to whether to accept or reject the signal parameters estimated by the signal processing method.

FIG. 10c is a gamma-ray energy spectrum 250 shown as a log-linear plot, produced by the signal processing method. The energy parameters that have been accepted are plotted as a histogram, where the horizontal axis represents the energy E(keV) of each signal in a respective bin, and the vertical axis represents the number of counts N of that energy determined to have been detected in the collection period (in this example, 1 s).

Figure 11:
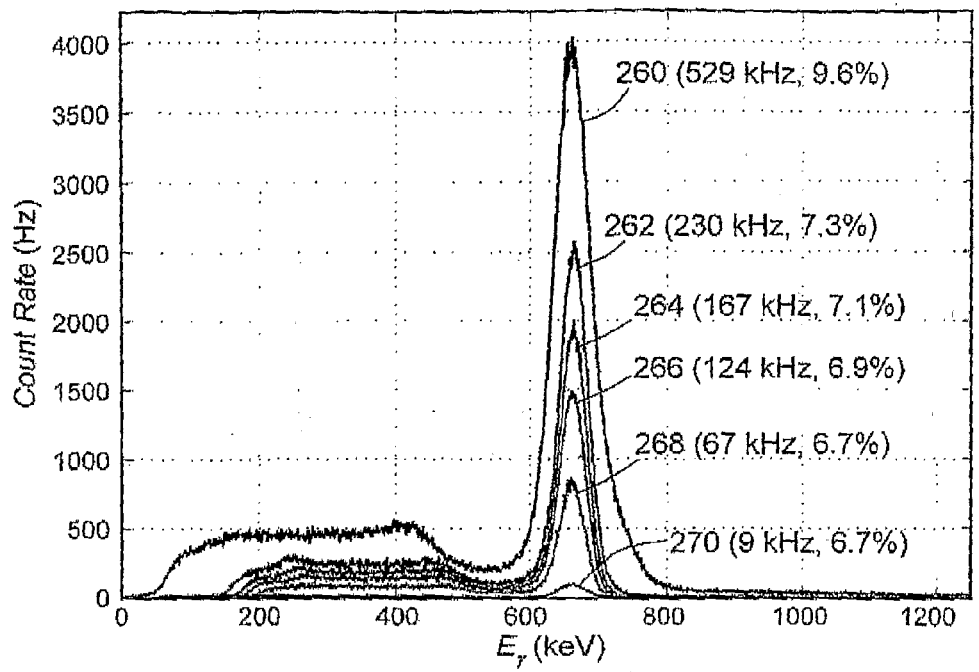
FIG. 11 are plots of gamma-ray spectra for a 137Cs source at various input count rates, processed with the method of FIG. 9.

FIG. 11 is a plot of exemplary gamma-ray energy spectra, collected using a sodium iodide NaI(TI) gamma-ray detector. The gamma-ray energy spectra shown in FIG. 11 demonstrate the performance of the signal processing method for pulse pile-up recovery at a range of count rates. The experimental data were collected using a 76 mm×76 mm Canberra brand NaI(TI) gamma-ray detector (model number 802) coupled to a detector base (model number 2007); no preamplifier was used. The signal processing hardware was connected to the dynode output of the detector base via a 65 MHz 14-bit analog to digital converter.

The NaI(TI) crystal was irradiated with a collimated gamma-ray beam, which ensured that the central portion of the detector was illuminated with an essentially parallel beam of gamma-rays; the beam diameter was 50 mm.

Two 137Cs gamma-ray sources of 0.37 GBq and 3.7 GBq, in combination with three calibrated aluminium transmission filters, were used to obtain a range of gamma-ray fluxes at the detector face. The detector to source distance remained constant during data collection.

Referring to FIG. 11, the spectra 260, 262, 264, 266, 268 and 270 were collected at count rates of respectively 529 kHz, 230 kHz, 167 kHz, 124 kHz, 67 kHz and 9 kHz. As would be expected, the energy resolution of the data collected with the apparatus and processed with the method of this embodiment deteriorated as the count rate increased. Expressed as a percentage of the peak energy (i.e. 661.7 keV), the full width at half maximum (FWHM) of the peak was found to be, respectively, 9.6% 7.3%, 7.1%, 6.9%, 6.7% and 6.7%. For count rates of 9 kHz to 230 kHz, the energy resolution of the 137Cs gamma-ray energy peak at 661.7 keV remained less than 7.5%; that is, despite more than a 25 fold increase in the count rate from the NaI(TI) detector, the energy resolution at 661.7 keV decreased by less than 0.5%.

Figure 12:
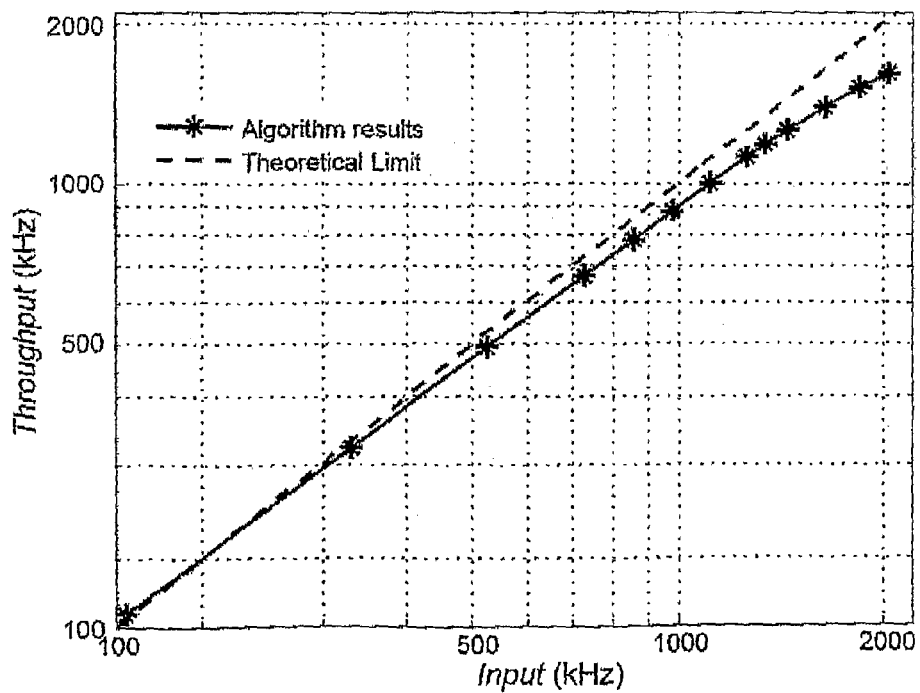
FIG. 12 is a plot of the results of a computer simulation of the signal processing method of FIG. 9 prepared using a simulated data set produced by a digital nuclear pulse generator.
Figure 13:
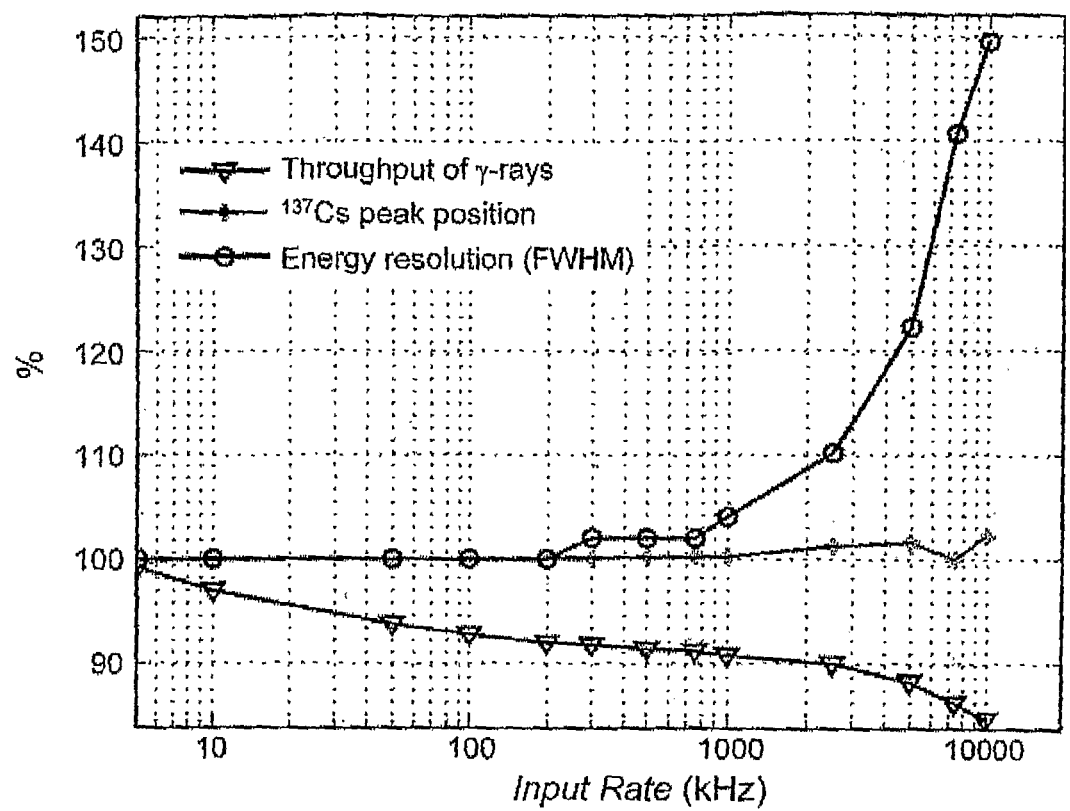
FIG. 13 is plot of the performance of the simulation of FIG. 12 for a gamma-ray source over a range of count rates.

The performance of the signal processing method of this embodiment is also illustrated in FIG. 12 and FIG. 13. These two figures were generated from the results of a computer simulation, in which the input count rate could be accurately controlled hence enabling a very wide range of input count rates to be considered. FIG. 12 is a log-log plot of the throughput of the signal processing method (i.e. that portion of the input count rate accurately detected) against input count rate from 0.1-2.5 MHz. The theoretical limit (i.e. where the throughput equals the input) is shown with a dashed line. This figure demonstrates that, over a very wide range of input count rates, the throughput of the signal processing method remains greater than or equal to 90%.

FIG. 13 is a linear-log plot comparable to FIG. 12 but with percentage throughput plotted against input count rate from 0.005-10 MHz. In addition, FIG. 13 includes plots of the energy resolution and peak position performance of the signal processing method of this embodiment. The energy resolution of the 137Cs peak degrades by less than 10% over 0-2.5 MHZ, and the peak position shows very little change over that range.

FIGS. 14a, 14b, 14c and 14d also depict the results of applying the signal processing method for pulse pile-up recovery of this embodiment to the output of a 76 mm×76 mm NaI(TI) gamma-ray detector. Approximately 14 µs of data was used to generate the data plotted in these figures. The figures are plots of energy E in arbitrary units against time t(µs).

Figure 14A:
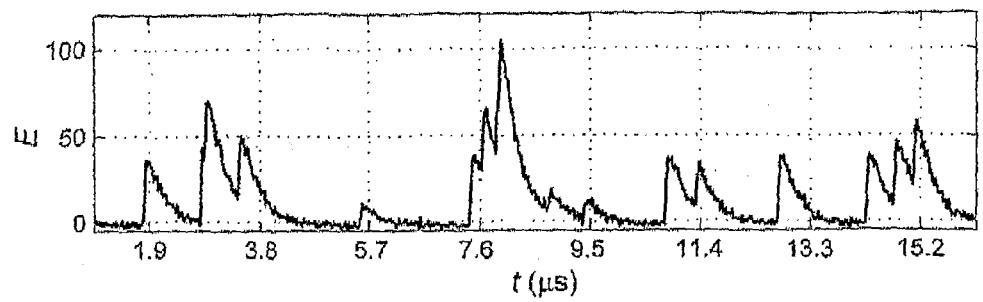
FIGS. 14a, 14b, 14c and 14d depict the results of applying the signal processing method of FIG. 9 to the output of a 76 mm×76 mm NaI(Tl) gamma-ray detector.
Figure 14B:
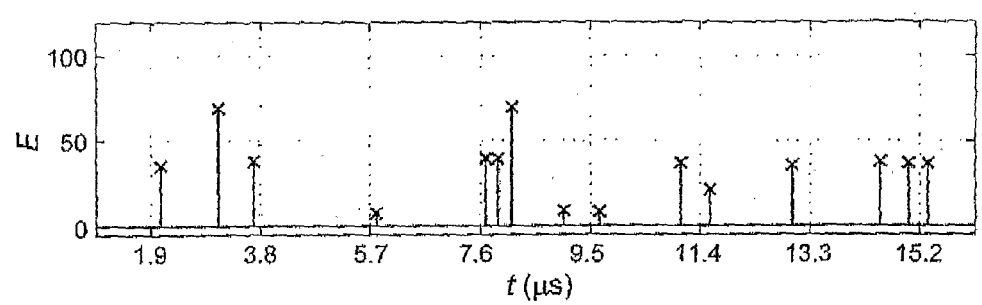
Figure 14C:
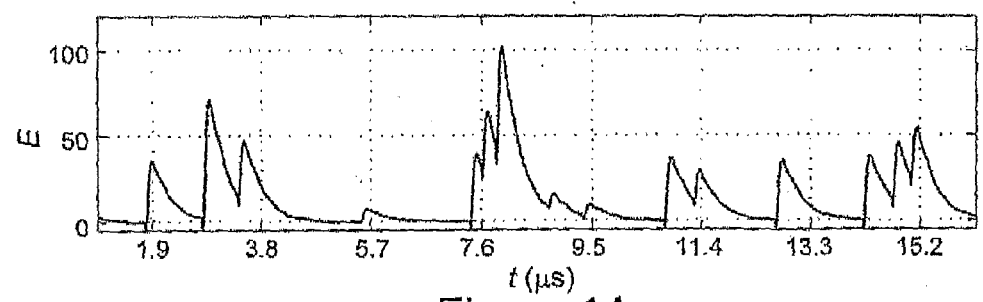
Figure 14D:
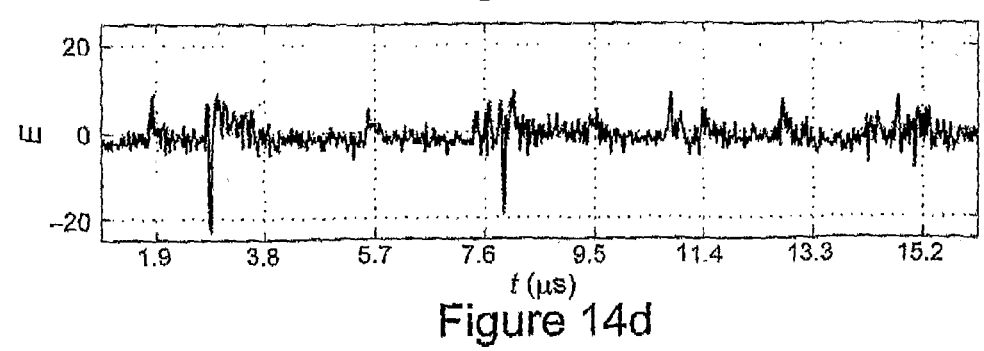

FIG. 14a is a plot of the output of AFE 94: an analog to digital conversion rate of 65 MHz and 14 bit resolution was used to covert the time varying voltage output of the detector to digital data. FIG. 14b is a plot of the results of applying the method. The temporal positions of the signals (depicted as vertical lines) have been resolved, as have the energies of the component signal (depicted as crosses). The temporal position and the energy of the component signal were used as described above, in conjunction with the signal form, to determine a model of the gamma-ray detector output: the resulting model is plotted in FIG. 14c.

The digitized output of the gamma-ray detector was compared with the model of the gamma-ray detector output to derive an estimate of the error made in characterizing the gamma-ray detector output. This error signal is plotted in FIG. 14d. It is then possible, on the basis of this error signal, to determine thresholds for the exclusion of signal parameter estimates, such as the decision to accept or reject an estimate of signal energy may be determined by the magnitude or the error near the position of a signal peak.

FIGS. 15a, 15b, 15c and 15d depict the results of applying the signal processing method for pulse pile-up recovery of this embodiment to data collected with a semiconductor (or solid state) detector. Such detectors employ the interaction of incident radiation with the electrons in the crystalline lattice of the semiconductor, forming electron hole pairs. Examples of these detectors include High-Purity Germanium (HPGe) detectors, Silicon Diode detectors, semiconductor drift detectors (such as Silicon Drift detectors), Cadmium Telluride (CdTe) detectors and CZT detectors.

Figure 15A:
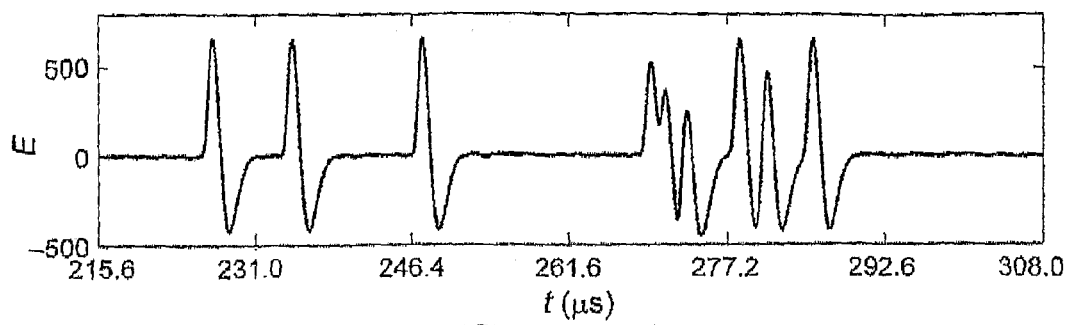
FIGS. 15a, 15b, 15c and 15d depict the results of applying the signal processing method of FIG. 9 to data collected with a HPGe detector.
Figure 15B:
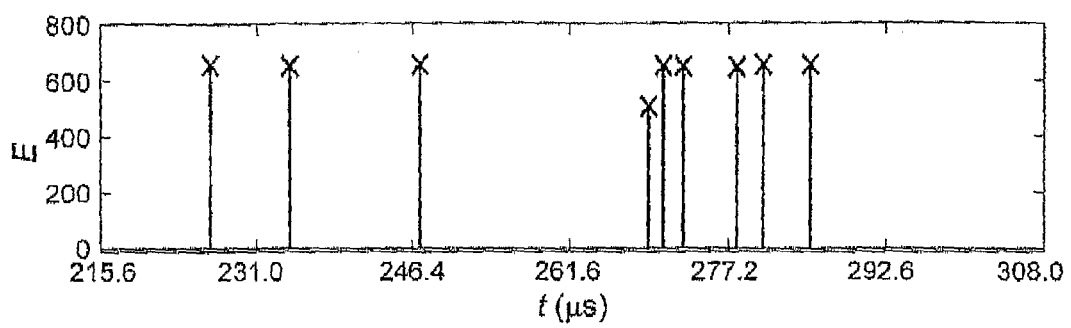
Figure 15C:
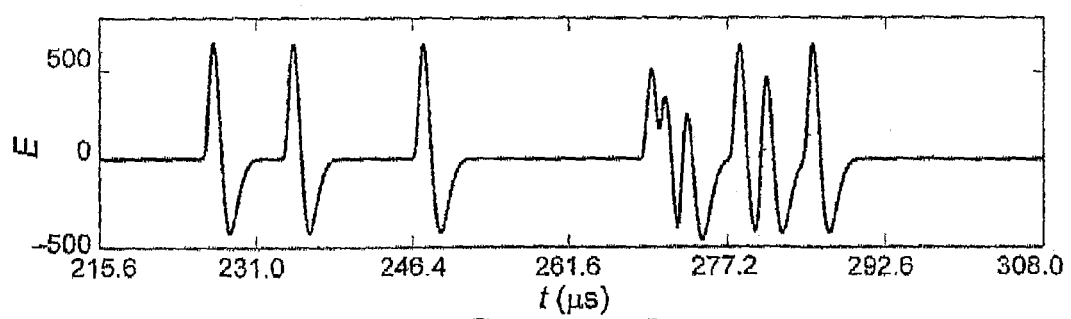

Hence, the apparatus of FIG. 1 was employed, though with a detector unit in the form of a Canberra Industries brand High Purity Germanium (HPGe) detector substituted for detector 16, and with a 57Co gamma-ray source (whose two principal gamma-rays have energies of 122.1 and 136.5 keV) rather than a neutron source and specimen. The output of the HPGe detector was fed through a pre-amplifier and then into an Ortec brand pulse shaping amplifier. Approximately 92 µs of data was collected, from which was generated the data plotted in FIGS. 15a, 15b, 15c and 15d as energy E in arbitrary units against time t(µs). FIG. 15a is a plot of the output of AFE 94. The time varying voltage output of the detector was converted to digital data at an analog to digital conversion rate of 65 MHz with 14 bit resolution. FIG. 15b is a plot of the results of applying the method. The temporal positions of the signals (depicted as vertical lines) have been resolved, as have the energies of the component signal (depicted as crosses). The temporal position, the energy of the component signal and the signal form were used to determine a model of the processed HPGe detector output, which is plotted in FIG. 15c.

Figure 15D:
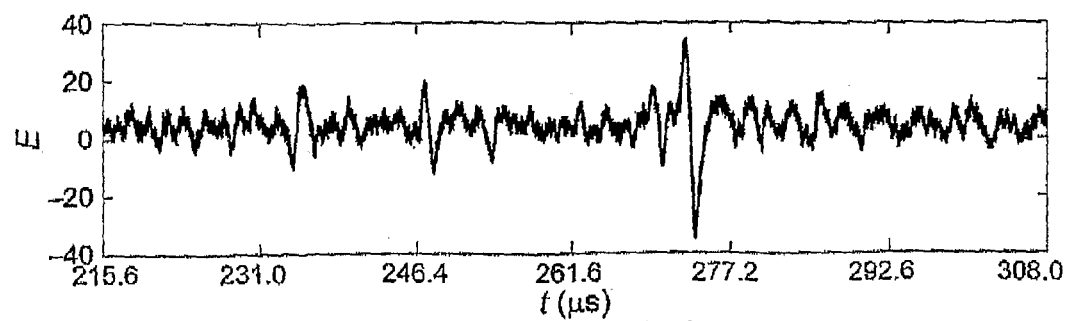

FIG. 15d is a plot of the error signal, derived from a comparison of the digitized processed output of the HPGe detector and the model of that output. This error signal can again be used to determine thresholds for the exclusion of signal parameter estimates.

FIGS. 16a, 16b, 16c and 16d depict the results of applying the signal processing method for pulse pile-up recovery of this embodiment to the output of a gas proportional detector used for detecting X-rays. Gas proportional detectors are a class of detector whose behavior is similar to that of solid state detectors. Gas proportional detectors rely on the interaction of the radiation with a gas in a chamber. An electric field is created in the chamber between an axial wire and the walls of the chamber. Radiation passing through the gas ionizes the gas, which produces electrons that then collect on the wire owing to the electric field, and are output as the detector data.

Thus, apparatus 10 of FIG. 1 was employed, though with a detector in the form of a Xenon gas proportional detector substituted for detector 16, and with an X-ray generator from an X-ray diffraction apparatus rather than an item to be screened. Approximately 300 µs of data was used to generate the data plotted in FIGS. 16a, 16b, 16c and 16d, which plot energy E in arbitrary units against time t(µs). A significantly longer data collection period was used compared with that of the previous examples, owing to the relatively long decay time of the xenon gas proportional detector (of the order of 60 µs or more). For this reason also the sampling rate of AFE 94 was reduced.

Figure 16A:
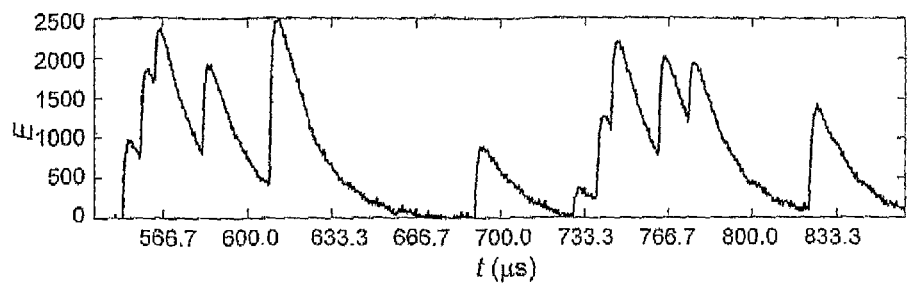
FIGS. 16a, 16b, 16c and 16d depict the results of applying the signal processing method of FIG. 9 to the output of a Xenon gas proportional detector.
Figure 16B:
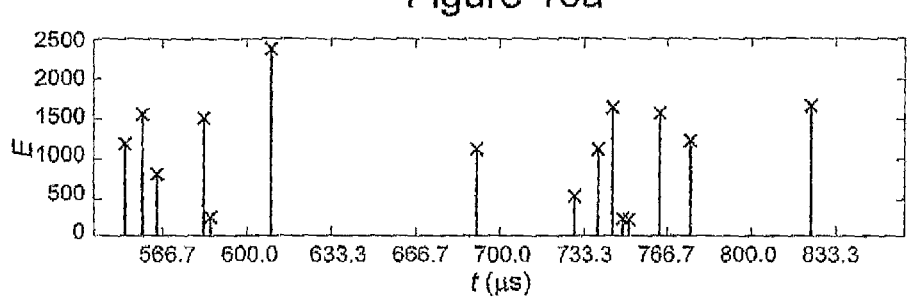
Figure 16C:
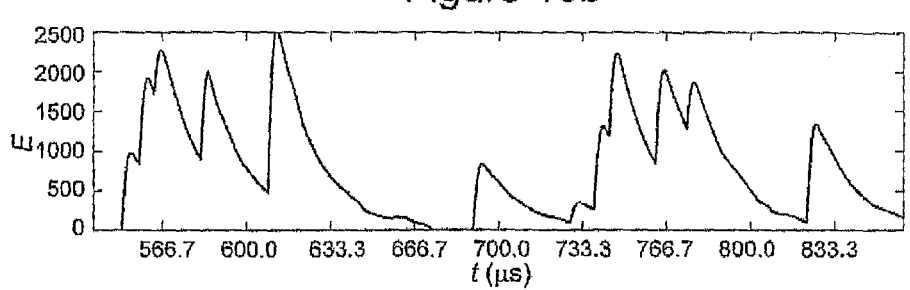
Figure 16D:
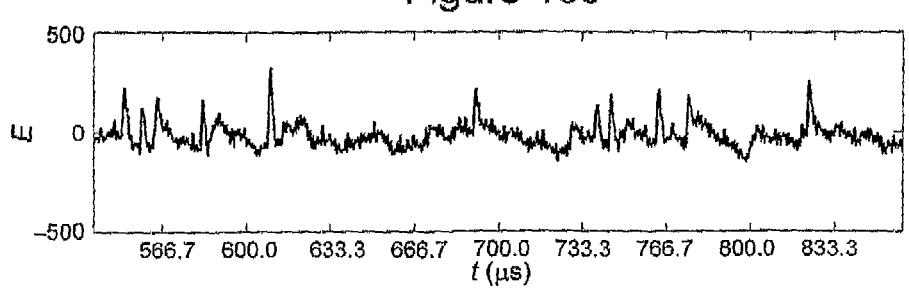

FIG. 16a is a plot of the output of AFE 94; in this example an analog to digital conversion rate of 15 MHz and 14 bit resolution was used to covert the time varying voltage output of the detector to digital data. FIG. 16b is a plot of the results of applying the method. The temporal positions of the X-ray signals (depicted as vertical lines) have been resolved, as have the energies of the component signal (depicted as crosses). The temporal position and the energy of the component signal were used as described above, in conjunction with the signal form, to determine a model of the Xenon gas proportional detector output: the resulting model is plotted in FIG. 16c.

The digitized output of the Xenon gas proportional detector was compared with the model of the Xenon gas proportional detector output to derive an estimate of the error made in characterizing the Xenon gas proportional detector output. This error signal is plotted in FIG. 16d. This error signal can then be used to determine thresholds for the exclusion of signal parameter estimates, such as the decision to accept or reject an estimate of signal energy may be determined by the magnitude or the error near the position of a signal peak.

Plural Signal Forms

For some detector types, such as large volume solid state detectors, the form of a given signal may be one of a plurality of possible signal forms. This may be intrinsic to the detector type, or be due to temperature or other measurement-specific factors.

For example, a CsI(TI) detector is a scintillation detector that, depending on whether a neutron or gamma-ray is being detected, exhibits two distinct signal forms. Solid state radiation detectors can exhibit a time-varying signal form, even when detecting only one form of radiation; large volume High Purity Germanium (HPGe) detectors, for example, can produce an output signal whose form depends on the specific site of interaction between the radiation and the detector. The interaction of radiation with the Germanium crystal of a HPGe detector produces a multitude of electron-hole pairs; radiation induced charge is carried by both the electrons and the holes. However, the electrons and holes travel through the HPGe detector at different velocities, so the charge pulse produced by the electrons generally has a different form from that produced by the holes. Thus, the pulse produced by the detector (being the sum of the charges carried by both the electrons and holes) has a form dependent on the location of interaction.

Hence, the plurality of signal forms are the result of these varied physical mechanisms. The respective signal forms may be denoted $d_1[n], d_2[n], \ldots, d_Q[n]$, where Q is the total number of different signal forms that may be generated by a particular detector type. Each of the possible signal forms is characterized in the same way that the signal form of data having a single signal form is characterized. With plural signal forms, however, the calibration process must be extended for an appropriate length of time to ensure that all of the possible signal forms have been identified and characterized; the estimation of signal parameters, including temporal position and signal energy, can be performed once the form of each signal in the data stream has been identified. In order to estimate these signal parameters correctly, a number of possible extensions of the method described above (for data with a single signal form) may be employed.

1. The signal parameters, including signal temporal position and signal energy, may be estimated for each signal in the data stream by treating all signals in the data stream as having the same form, such as of the first signal, viz. $d_1[n]$. The parameters for those signals that do not acceptably conform to signal, form $d_1[n]$ are rejected at the validation phase; signals for which the parameters have been estimated successfully and thus acceptably conform to signal form $d_1[n]$ are subtracted from the data stream. This process is repeated successively for $d_2[n]$ up to $d_Q[n]$, where at each stage signal parameters are estimated for signals that are of the signal form used at that stage. At each stage matrix Equation 4 is solved with matrix A constructed repeatedly using, in iteration p, the signal form $d_p[n]$. At the conclusion of the process, those signals that have not passed the validation phase for any of the plurality of signal forms are rejected as not acceptably conforming to any of the plurality of signal forms.

2. In a variation of the first approach, the signal parameters are estimated for each of the signal forms in turn, but the signal estimates are not subtracted at each stage. Instead, the estimated signals are used in a final signal validation stage to determine the signal form and signal parameters that provide the best overall estimate of the data stream. This allows for the possibility that a signal is incorrectly estimated to be of one form, when it is actually of a form that has not yet been used to estimate the signal parameters.

3. In a further variation of the first approach, it may be possible to model each of the signal forms $d_p[n]$ as a linear combination of two signal forms, termed $d_1[n]$ and $d_2[n]$ for convenience. Hence, the pth signal form $d_p[n]$ is modeled as:

$$d_p[n] = (a \cdot d_1[n] + b \cdot d_2[n]) \tag{8}$$

where a and b are unknown constants that can be determined directly from this equation if necessary. In order to solve the matrix equation in this case, the matrix equation is extended to be:

$$x = [A_1 \vdots A_2] \begin{bmatrix} \gamma \\ \ldots \\ \beta \end{bmatrix} + \omega, \tag{9}$$

where the sub-matrices $A_1$ and $A_2$ are formed from the signal forms $d_1[n]$ and $d_2[n]$ respectively using Equation 5. The vector of unknown signal energies $\alpha$ has been redefined as being made up of vectors $\gamma$ and $\beta$, so that the energy of the actual signal form of signal i can be estimated as $\alpha_i = \gamma_i + \beta_i$. The new system of linear equations is solved using the same methods as those used to solve the earlier matrix equation, Equation 4. It should be noted that this approach allows for the possibility that the signal form may be from a continuum of possible signal forms that can be represented as a linear combination of the two signal forms $d_1[n]$ and $d_2[n]$.

Thus, this approach permits a practically unlimited number of signal forms to be represented.

4. In a further variation of approach 3, the procedure of decomposition of each of the plurality of signal forms into a linear combination of just two signal forms may be extended to the general case where the plurality of signal forms may be decomposed as a linear combination of an arbitrary number of signal forms. The matrix A and the signal energy vector $\alpha$ is augmented accordingly.

EXAMPLES

Apparatus 10 was tested by locating detector 14 with a test item 12 in a shielded room. Detector 14 was in the form of a SAIC (trade mark) PELAN detector.

Figure 17:
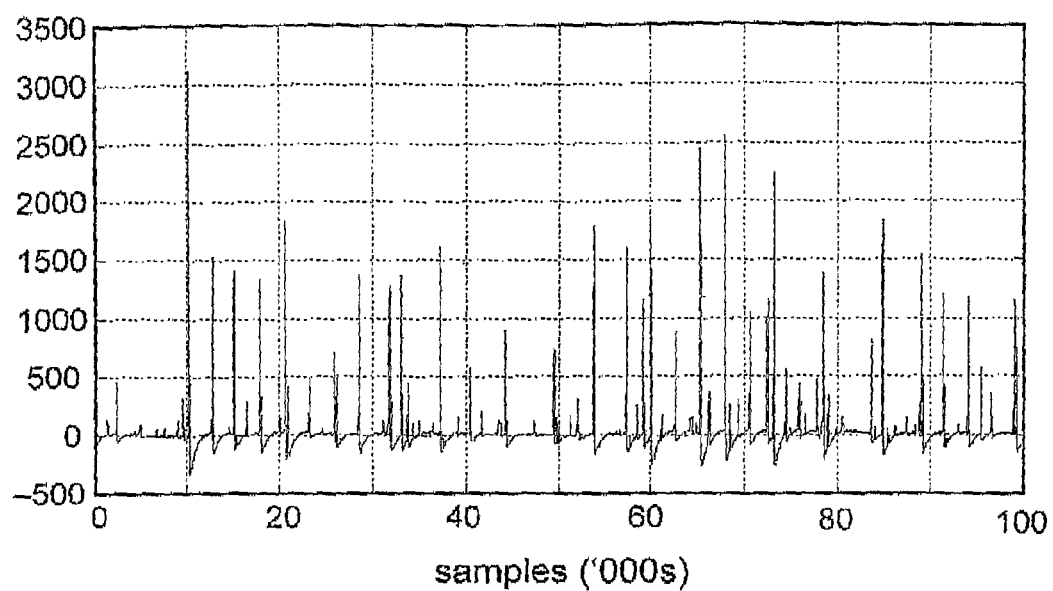
FIG. 17 is a representative section of digitized output from an exemplary detection apparatus according to the embodiment of FIG. 1, comprising a detector in the form of a SAIC (trade mark) PELAN.

An oscilloscope was used to determine that the output pulses from pulse shaping amplifier 16 would remain within the ±1 volt range of the input stage of the ADCs of pulse processing module 18. Shown in FIG. 17 is a representative section of digitized output from detector 14, collected using pulse processing module 18. The settings on pulse shaping amplifier 16 remained constant for all examples: 1 µs pulse shaping; gain of 5×0.5; and a uni-polar pulse shape.

Five experimental environments were arranged to evaluate the performance of the pulse processing under a range of conditions. The experimental variables are presented in Table 1. For the first data collection experiment, only a bladder of water was present in front of detector 14, but in subsequent experiments—to make the spectra more interesting—a 'poly' target was added.

TABLE 1

Experiment configurations for data collection from detector 14

| Example | Target(s) | Neutron Generator Voltage | Est. Neutron Flux | Collection time |
|---|---|---|---|---|
| A | Water | 60 kV | 0.5 × 10⁸ | 1000 files |
| B | Water and poly | 60 kV | 0.5 × 10⁸ | 1000 files |
| C | Water and poly | 70 kV | 1.0 × 10⁸ | 1000 files |
| D | Water and poly | 80 kV | 1.0 × 10⁸ | 296 files* |
| E | Water and poly | 80 kV | 1.0 × 10⁸ | 1000 files |
| F | Water and poly | 85 kV | 1.7 × 10⁸ | 1000 files |

*In example D, data collection was terminated early owing to the premature shutdown of detector 14.

The objective of the analysis was to determine the radiation energy spectra for each of the source configurations.

The analysis was performed in an off-line manner, where the recorded data were 'played' into processing module 18, and the output of the pulse processing was used to produce energy spectra for display on computer 20. The analysis process is illustrated in FIG. 8, which also shows intermediate steps of the analysis.

Figure 18:
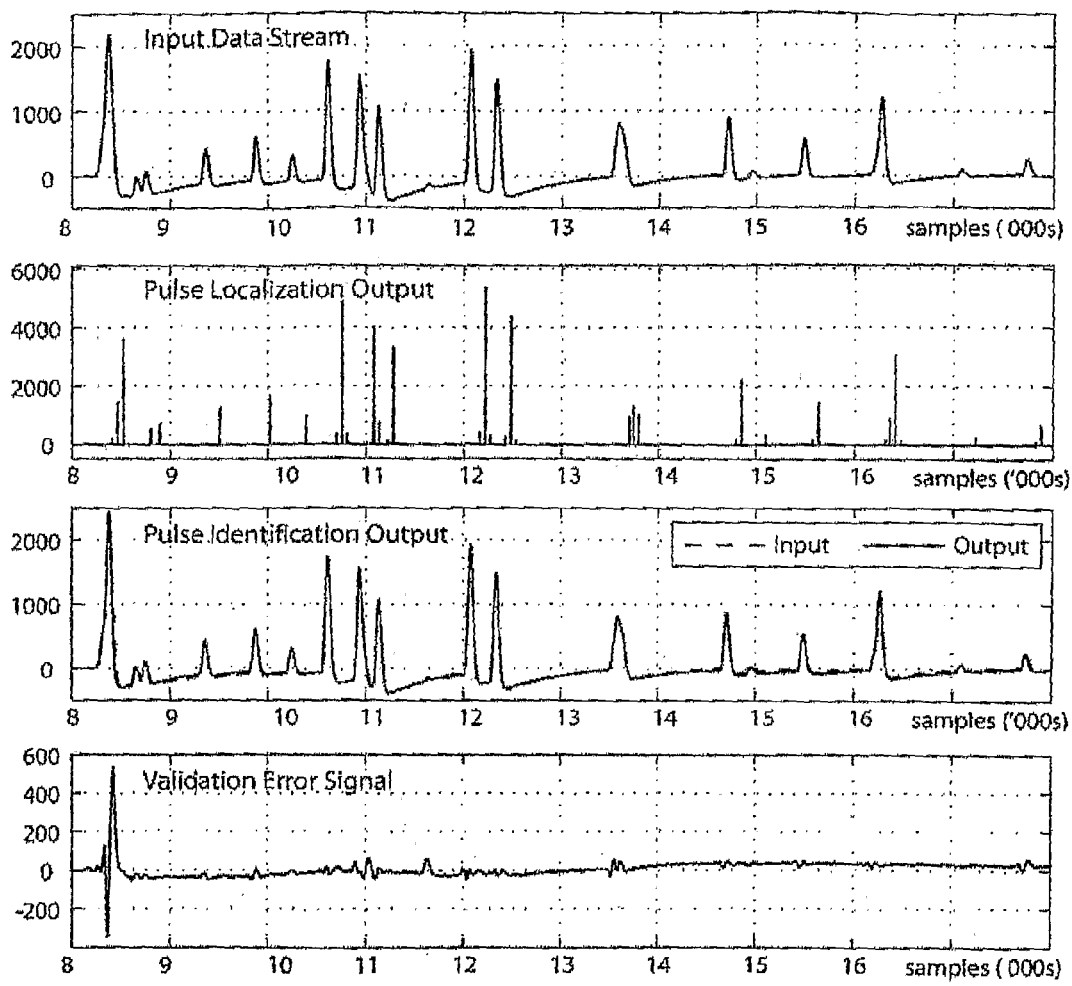
FIG. 18 comprises plots illustrating the different stages of data processing, showing a section of (i) the output from the AFE of the apparatus of FIG. 1, (ii) the output of the Pulse Localization Stage of the apparatus of FIG. 1, (iii) the output of the Pulse identification stage of the apparatus of FIG. 1, and (iv) the output of the validation phase of the apparatus of FIG. 1.

The data from various stages of pulse processing module 18 is depicted in FIG. 18. From top to bottom, these are: (i) the output from AFE 94, operating at 14-bit accuracy and a digitization rate of 26.25 MHz: approximately 381 μs of digitized detector data is illustrated; (ii) the output of the Pulse Localization Stage, which identifies the temporal position of each of the gamma-ray events in the data stream, indicated by vertical lines; (iii) the output of the Pulse Identification stage, where the energy of all gamma events is estimated, with the output shown overlaid on the original system input data, illustrating the pile-up recovery function of pulse processing module 18 whereby even multiply piled-up pulses can be accurately characterized; and (iv) the output of the validation phase, which is used to determine the accuracy of all signal parameters estimated: large spikes in the validation signal are identified, such as that seen at sample 8300, and inaccurate signal estimates discarded.

In addition to performing pulse processing, it was also necessary to determine which sections of the data were recorded with the neutron source of detector 14 on and which sections were recorded with the source off. In the experimental setup this synchronization data was not accessible, so the data was examined to determine whether the source was on or off, based on an understanding of the neutron source duty factor (10 μs on and 90 μs off). However, in the absence of the synchronization signal, this allocation is susceptible to error, and can lead to the following problems:

1. Signals allocated to source on, when source was off; however, as the number of detections during intervals when the source is on is much greater than when the source is off, there is unlikely to be significant degradation of the "source on" spectrum; and
2. Signals allocated to source off, when the source is on: misallocations of this type are more likely to cause degradation of the "source off" spectra. It is likely that additional spurious detections will be present, so feature resolution will not be as good as it would be if the synchronization signal was available.

Experimental Results

Six experiments were performed, with the various target configurations and neutron intensities presented in Table 1. For each of the experiments, data was recorded at the output of pulse shaping amplifier 16. For each experiment, 1000 data files were recorded, with each file containing 260,000 data samples, or approximately 9.9 ms of data at the 26.25 MHz sampling rate. Hence a total of just less than 10 seconds of data was recorded for each experiment.

Figure 19:
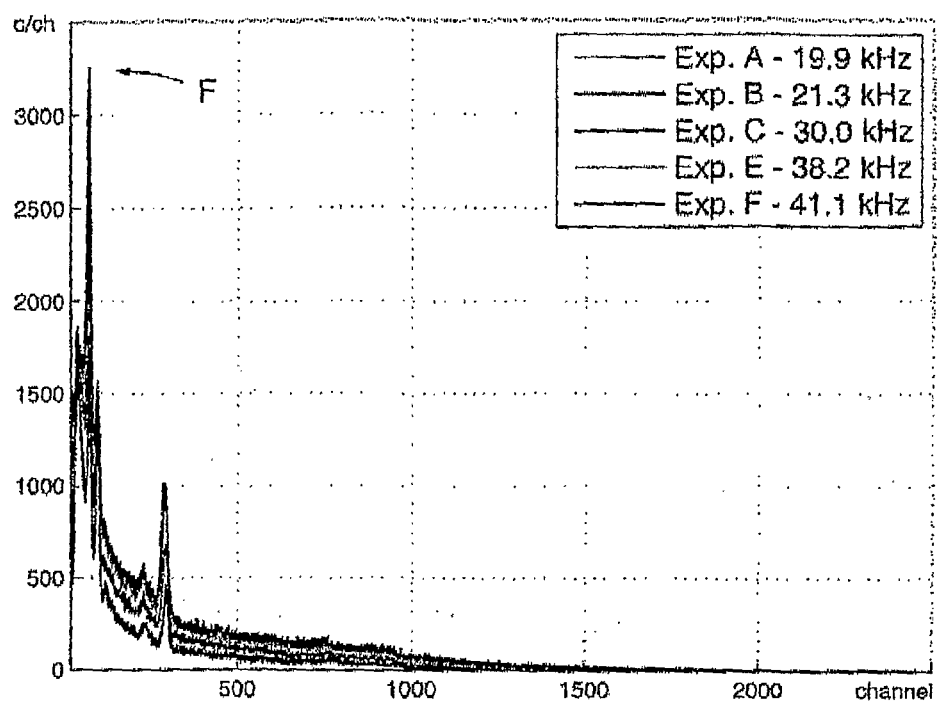
FIGS. 19 to 21 are combined gamma-ray energy spectra, collected both when the neutron source was on and off, with the apparatus of FIG. 1.
Figure 20:
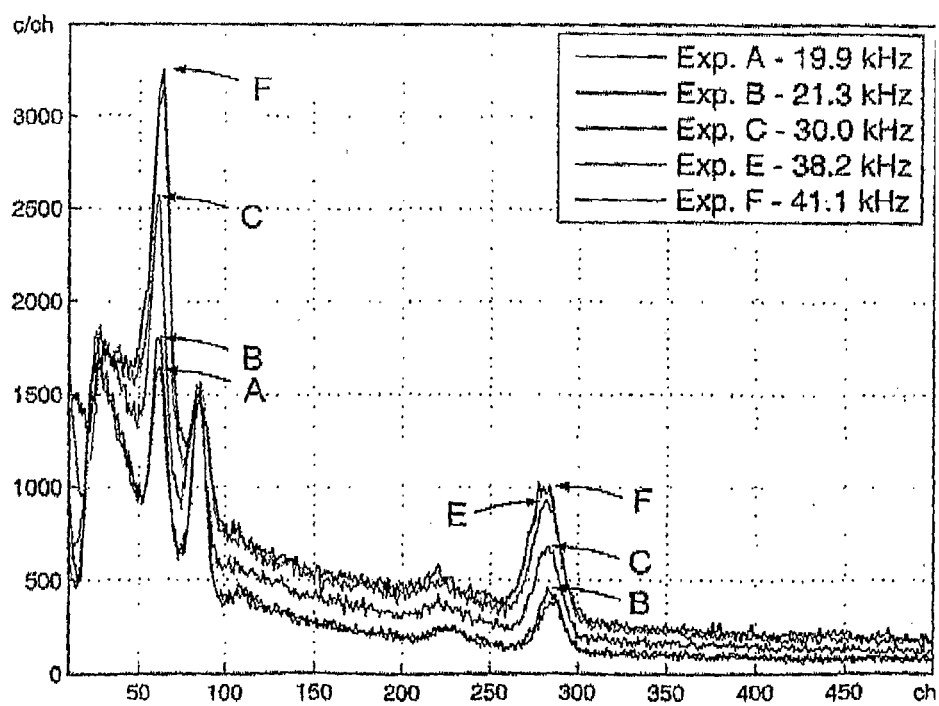
Figure 21:
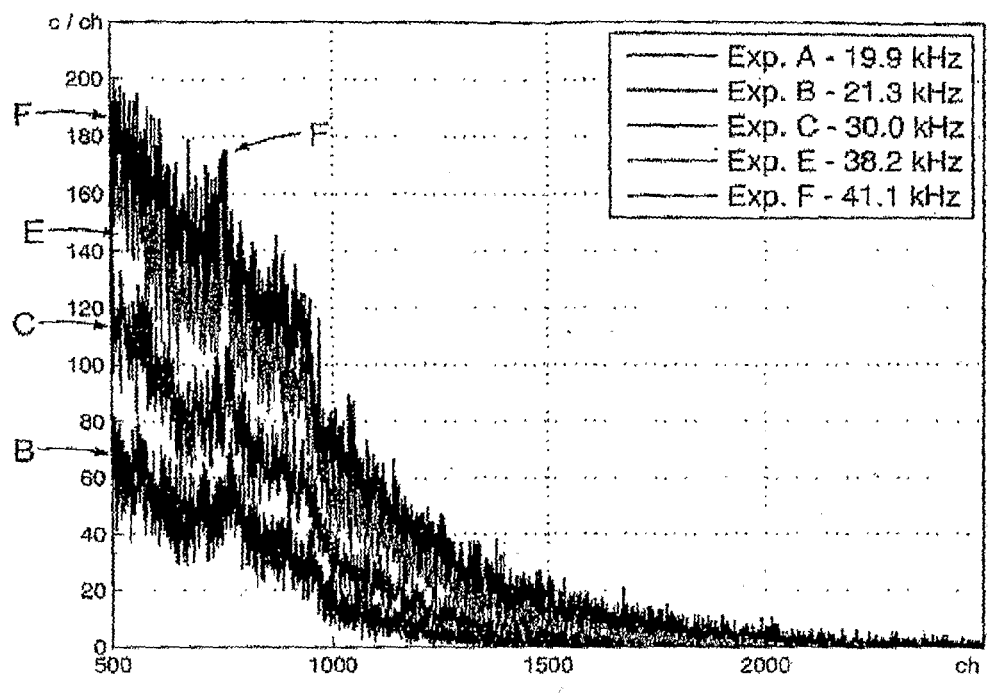
Figure 22:
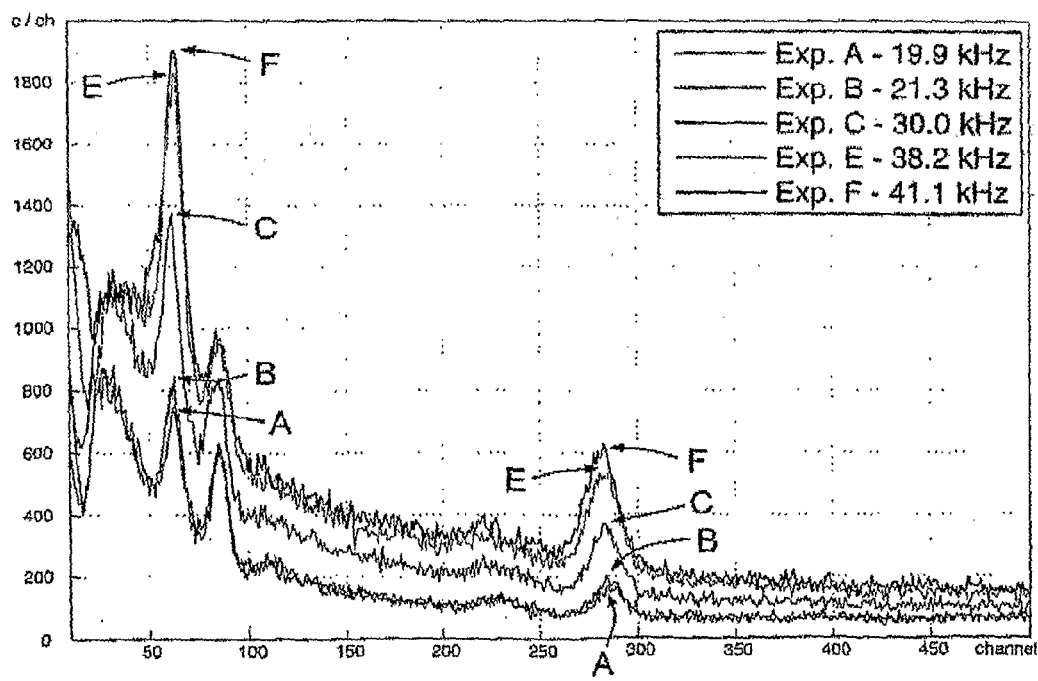
FIGS. 22 and 23 are spectra collected during the neutron pulse, with the apparatus of FIG. 1.
Figure 23:
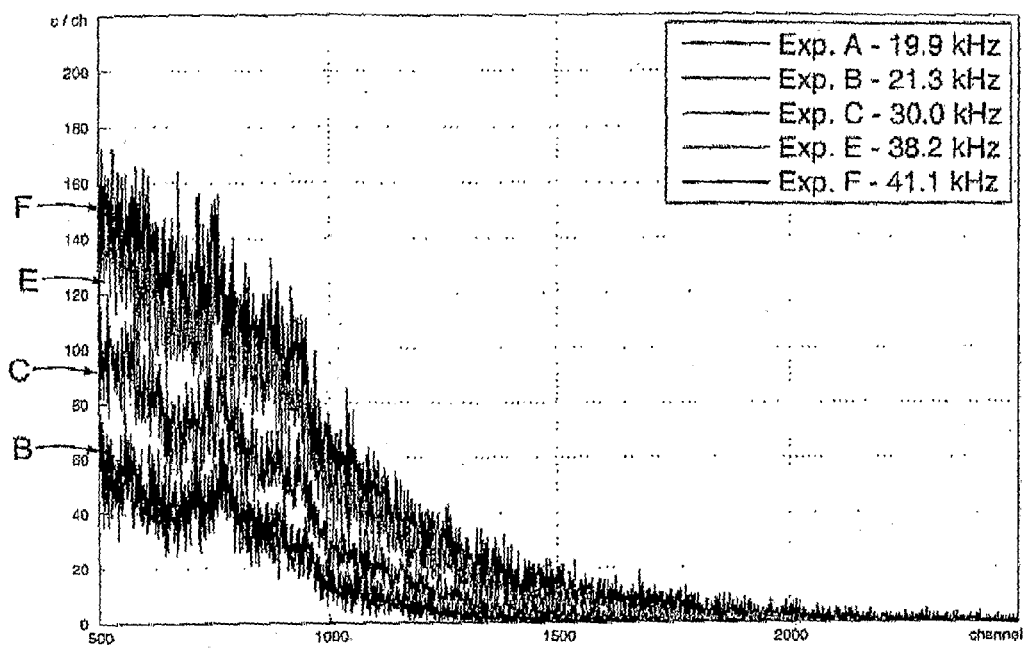
Figure 24:
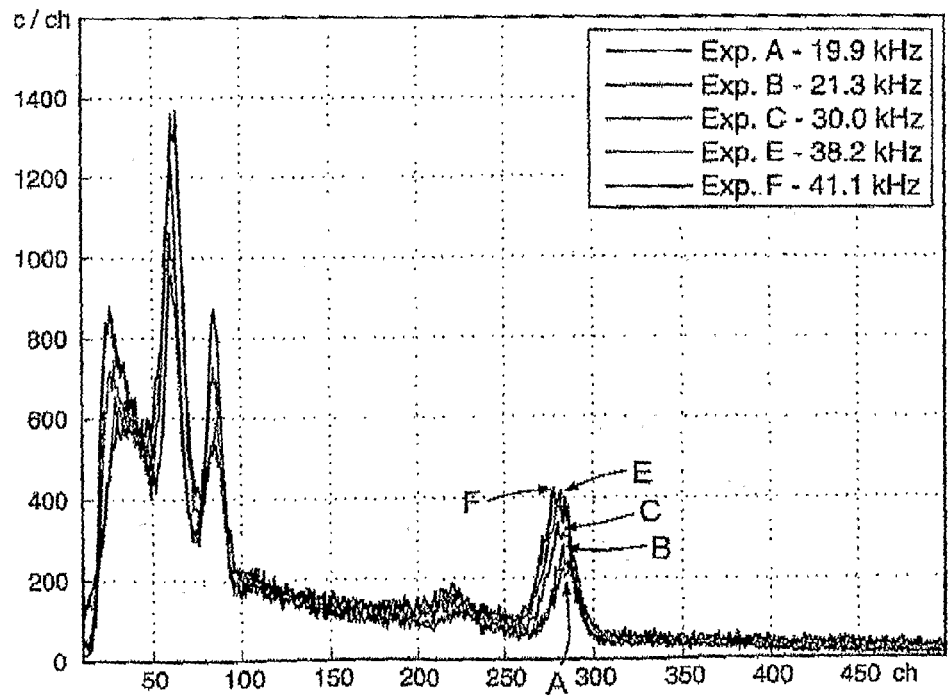
FIGS. 24 and 25 are the spectra collected between neutron pulses, with the apparatus of FIG. 1.
Figure 25:
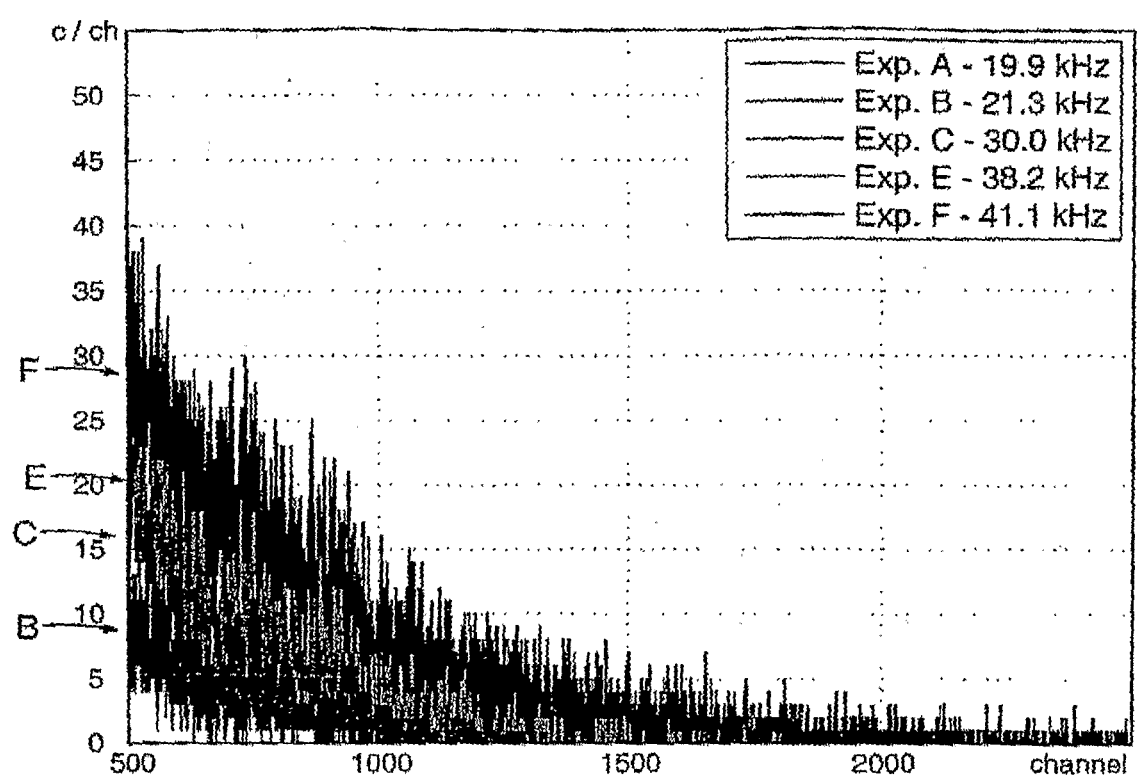

The results of processing data collected during examples A, B, C, E and F are presented in FIGS. 19 to 25. These figures show the energy spectra produced for each of the five experiments, potted as counts versus channel number. The five spectra (from examples A, B, C, E and F) are overlaid in each case so that differences between the spectra can be observed. In some cases the spectra are additionally labeled according to experiment. FIGS. 19 to 21 are the combined gamma-ray energy spectra; these spectra contain contributions from when the neutron source was on and when it was off. FIGS. 22 and 23 are the spectra collected during the neutron pulse while illustrated in FIGS. 24 and 25 are the spectra collected between neutron pulses.

Specifically, FIG. 19 is the entire energy spectrum both "source on" and "source off". FIG. 20 is the low energy spectrum both "source on" and "source off". FIG. 21 is the high energy spectrum both "source on" and "source off". FIG. 22 is the low energy spectrum for the "source on" spectra. FIG. 23 is the high energy spectrum for the "source on" spectra. FIG. 24 is the low energy spectrum for the "source off" spectra. FIG. 25 is the high energy spectrum for the "source off" spectra.

The data presented in these figures demonstrates the performance of apparatus 10. The throughput performance of the pulse processing module 18 is particularly apparent in FIGS. 20 and 21: a doubling of the counts registering in the detector from 20 kHz to just over 40 kHz produces a similar increase in the height of the energy peaks. This supports the observation that pulse processing module 18 maintains high throughput, with few pulses lost owing to pulse pile-up.

Figure 26:
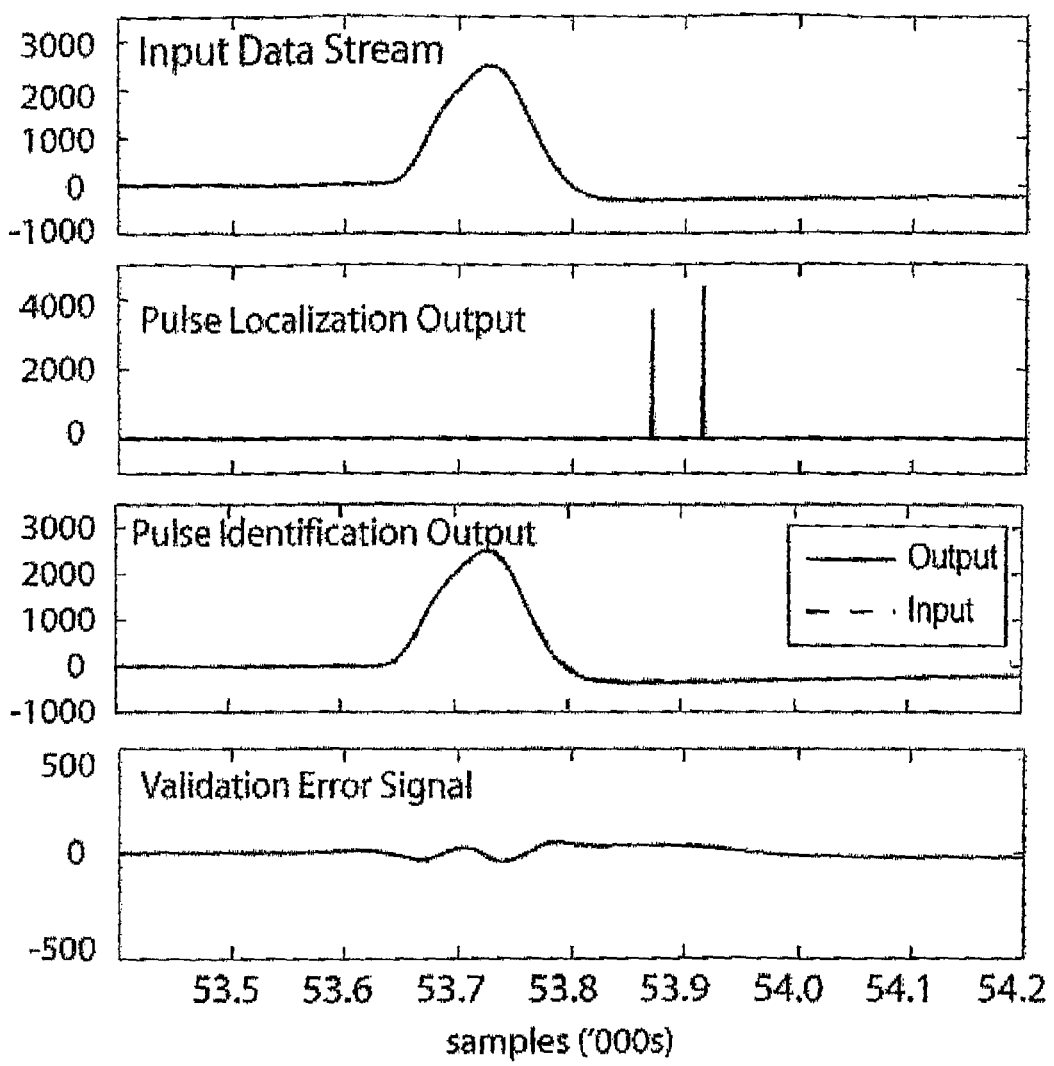
FIG. 26 comprises plots illustrating the different stages of data processing, showing (i) the input data stream received from the detector of the apparatus of FIG. 1 during example F, (ii) the pulse localization output, (iii) pulse identification output, and (iv) the validation error signal.

The dead time performance of pulse processing module 18 is illustrated by FIG. 26. From top to bottom, FIG. 26 shows: (i) the input data stream received from detector 14 during example F (cf. FIG. 17), with substantial pulse pile-up evident, (ii) the pulse localization output, (iii) pulse identification output, and (iv) the validation error signal. FIG. 26 shows how pulse pile-up has been accurately estimated as summation of two pulse and the relative energies determined (with a delay between pulses in the illustrated example of only 1.7 μs).

Figure 27:
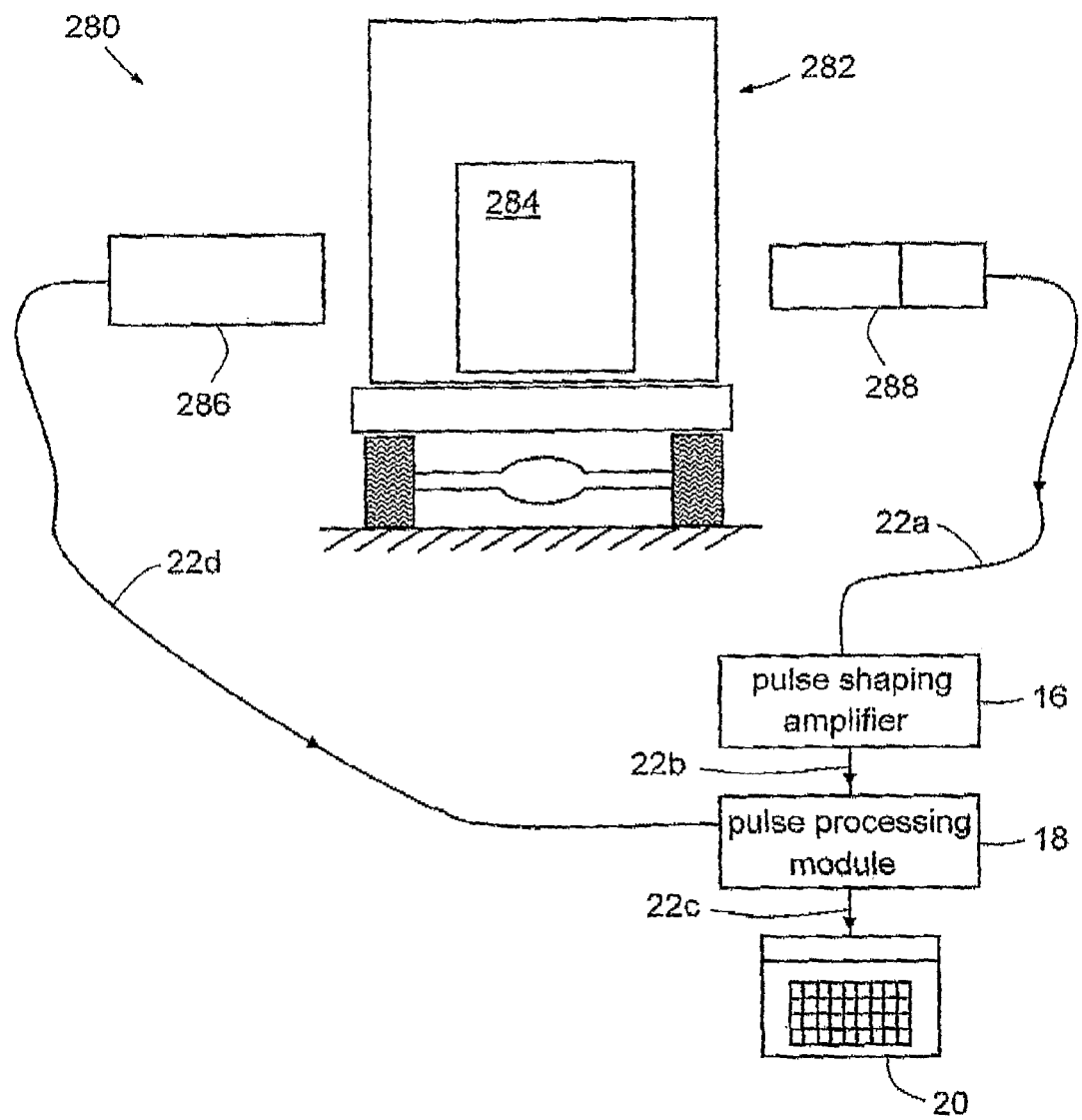
FIG. 27 is a schematic view of a cargo screening apparatus according to another embodiment of the present invention, with a truck carrying a load to be screened.

According to another embodiment of the present invention, there is provided a cargo screening apparatus, illustrated schematically at 280 in FIG. 27 with a truck 282 (viewed from its rear) carrying a load 284 to be screened. Apparatus 280 is similar in many respects to apparatus 10 of FIG. 1, and like reference numerals have been used to identify like features.

However, apparatus 280 differs from apparatus 10 of FIG. 1 in having a pulsed neutron source 286 and a separate gamma-ray detector 288. This allows a cargo or load 284 to be inspected to be located between neutron source 286 and detector 288.

The output of detector 28B is fed, via coaxial cable 22a, into pulse shaping amplifier 16. Neutron source 286 outputs a synchronization signal, which is transmitted to pulse processing module 18 via data cable 22d, allowing signals from detector 288 to be separately analysed—if desired—according to whether the neutron source 286 is on or off.

Figure 28:
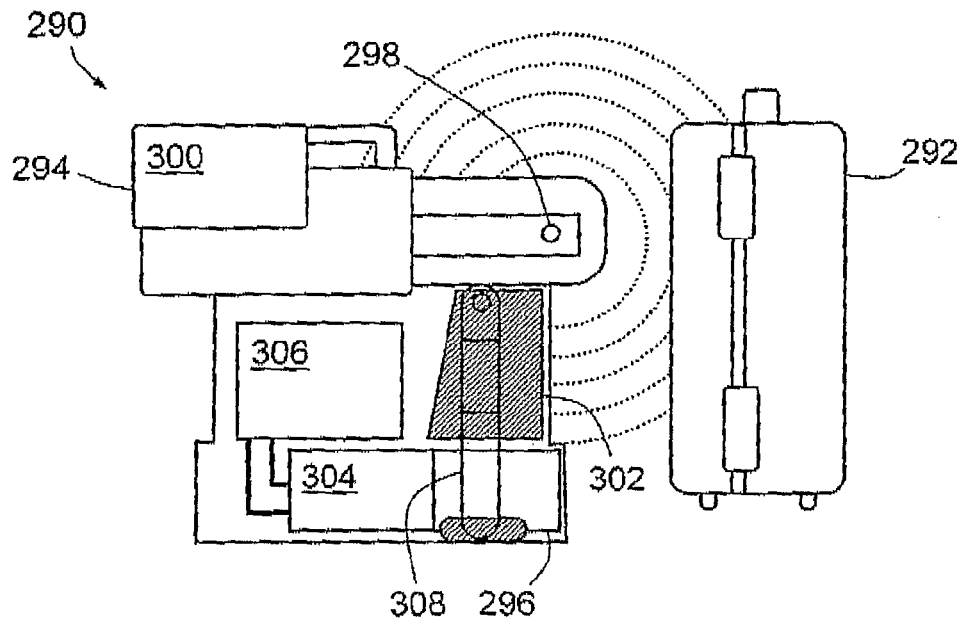
FIG. 28 is a schematic view of a parcel screening system according to another embodiment of the present invention, with an item to be screened in the form of a suitcase.

FIG. 28 is a schematic view of a screening system 290 for the detection of contraband, such as drugs, chemicals and explosives, by neutron activation techniques according to another embodiment of the present invention (shown with an item to be inspected, in this example in the form of a suitcase 292). Screening system 290 is single sided, having a radiation source 294 and a radiation detector 296 adapted to be located on the same side of suitcase 292. Radiation source 294 comprises, in this example, an electric neutron generator (ENG), though in other embodiments it may comprise an isotopic source such as an AmBe source or a Cf 252 source. The neutron output of an ENG can be significantly higher than that of isotopic sources, and also safer as the source of neutrons can be turned off when not in use. Neutrons are produced in an ENG by electrically accelerating deuterium ions into a tritium or deuterium target 298. It is also possible to pulse ENG 294 at rates of up to tens of kHz, which may be useful in order to analyse the time distribution of the subsequent neutron or gamma-ray flux. ENG 294 includes an electronics sub-system 300 to control the operation of ENG 294, including both its production of neutrons and its fail safe systems.

In use, ENG 294 emits neutrons isotropically and interact with suitcase 292. These neutrons interact with the constituent elements of suitcase 292, and a radiation flux is detected by radiation detector 296. The radiation comprises back-scattered neutrons and gamma-rays, and detector 296 includes both a neutron detector and a gamma-ray detector. In other embodiments, detector 296 may comprise only a neutron detector or only a gamma-ray detector, according to application.

Screening system 290 also includes shielding 302 between ENG 294 and radiation detector 296 to reduce the direct detection of source radiation that has not interacted with suitcase 292. Screening system 290 includes an amplifier 304 for amplifying signals outputted by detector 296, and detection electronics 306 for receiving and processing the amplified signals according to the signal processing method for pulse pile-up recovery of the embodiment of FIG. 9.

Screening system 290 also includes stabilising arms 308 for supporting system 290 during measurements. Such measurements may take 2 to 5 min, depending on the item being examined, the amount of contraband present in that item and what is, deemed to be acceptable measurement reliability. For example, detecting 1 kg of the explosive TNT in a suitcase positioned 30 cm from the device may take 5 min, while detecting a larger mass of TNT, such as 5 kg, may take only 2 min.

In this embodiment, detector 296 comprises a Bismuth Germanate (BGO) scintillation detector, in which a photocathode is used in conjunction with a photomuitiplier tube to convert emitted light due to detected radiation events into photo-electrons, which are readily amplified and processed (by detection electronics 306). A BGO detector has the advantages of having good radiation hardness, a high detection efficiency for incoming radiation, events (due to its high density and high Z value) and mechanical strength. However, it has a scintillation light output with a decay time of 300 ns, owing to which a detection system based on BGO scintillators may have a dead time of approximately 3 μs (where the dead-time is the period after the detection of one event during which it is not possible to accurately detect any subsequent events). If two events occur within the dead-time they pile-up on top of each other and the energy of each event cannot be accurately determined. When this occurs all piled-up events must be, discarded to ensure that the resulting energy spectrum is not corrupted.

Figure 29A:
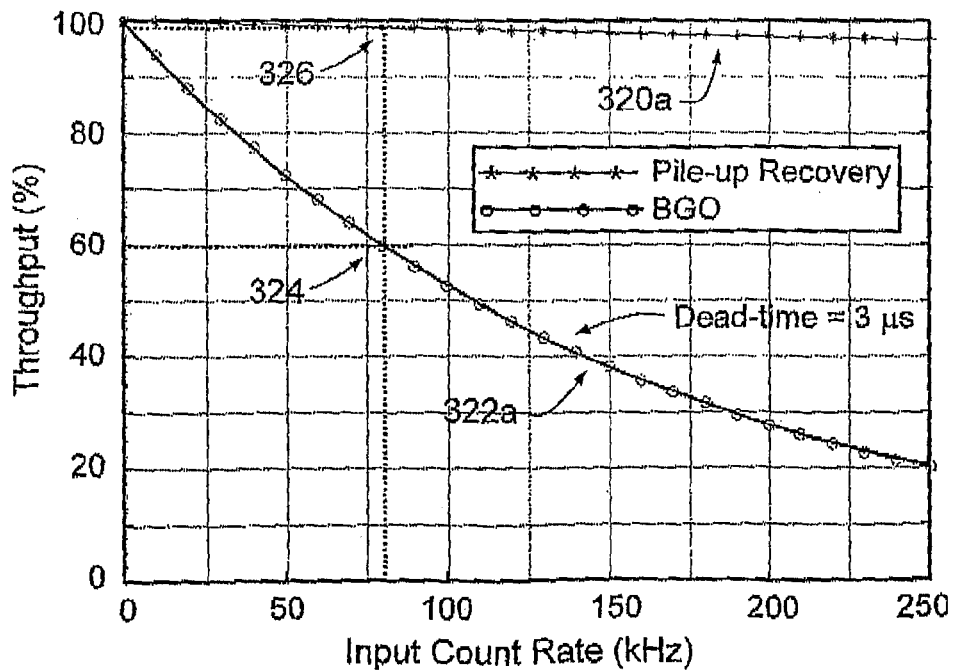
FIGS. 29a and 29b are plots of percentage throughput as a function of input count rate calculated for the screening system of FIG. 28 assuming a dead-time of 3 µs, and of the calculated performance of the signal processing method for pulse pile-up recovery of an embodiment of the present invention.
Figure 29B:
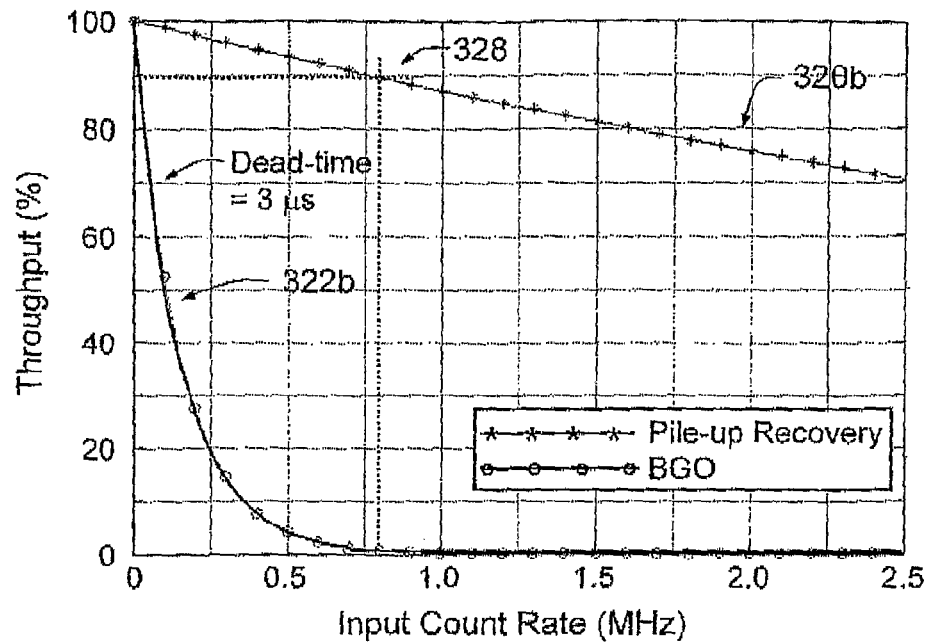

FIGS. 29a and 29b are plots of the calculated detector percentage throughput, that is, of incoming radiation events that are not affected by pulse pile-up, versus input count rate, for both screening system 290 (plotted as stars at 320a and 320b) and for screening system 290 modified to include conventional data processing (plotted as circles at 322a and 322b). In both cases the dead-time of screening system 290 is assumed to be 3 μs. At an input count rate of 80 kHz, it is apparent (see point 324 in FIG. 29a) that approximately 40% of all the events impinging on detector 296 wilt be lost owing to pulse pile-up when conventional data processing is employed.

Figure 30:
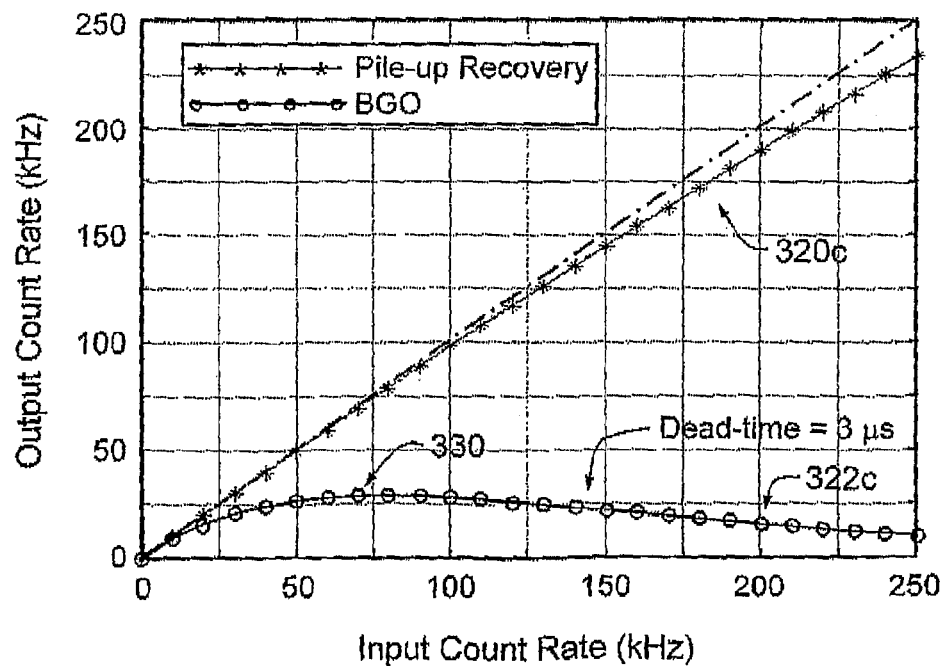
FIG. 30 are plots of throughput count rate as a function of input count rate, calculated for the screening system of FIG. 28 assuming a dead-time of 3 µs, and of the calculated performance of the signal processing method for pulse pile-up recovery of an embodiment of the present invention.

FIG. 30 plots the same data, for both screening system 290 (plotted as stars at 320c) and for screening system 290 modified to include conventional data processing (plotted as circles at 322c), but as output count rate (9 kHz) versus input count rate (kHz). The ideal limit (i.e. where the throughput equals the input) is shown with a dashed line. As is apparent, a count rate is rapidly reached (see point 330) at which a further increase in the incoming count rate does not increase the number of detected events. The BGO detector has a fixed dead time so, as the input count rate increases, the probability of pile-up becomes greater; this is because, as the input count rate increases, the data corrupted by pulse pile-up must be discarded and cannot be used.

Referring to FIG. 29a, at the input count rate where screening system 290 with conventional data processing has a dead time of 40% (viz. 80 kHz), screening system 290 according to this embodiment has a throughput of about 98% (see point 326). Consequently, for a particular item being analysed and ENG 294 neutron output flux, the time required for detection of contraband would be reduced. It is thus expected that the screening of an item could be completed in less than 65% of the time required with conventional data processing, such as 3.25 min for 1 kg of TNT explosive and 1.33 min for 5 kg of TNT explosive in the scenarios outlined above.

Furthermore, screening system 290 can operate at significantly higher count-rates than is possible with traditional scintillation detectors, such as BGO, and conventional electronics. FIGS. 29a and 29b show that, even at an input count rate of 800 kHz, there is only a small reduction in the percentage throughput achieved by screening system 290. At an input count rate of 800 kHz (point 328), for example, the throughput remains greater than 85%.

If an operating point is chosen for ENG 294 so that the input count rate to detector 296 is 800 kHz, it would be possible to further reduce the time required to inspect suitcase 292 for explosive or other contraband; it is expected from these results that 1 kg of TNT explosive could be detected in approximately 30 s and 5 kg of TNT explosive in less than 20 s.

Figure 31:
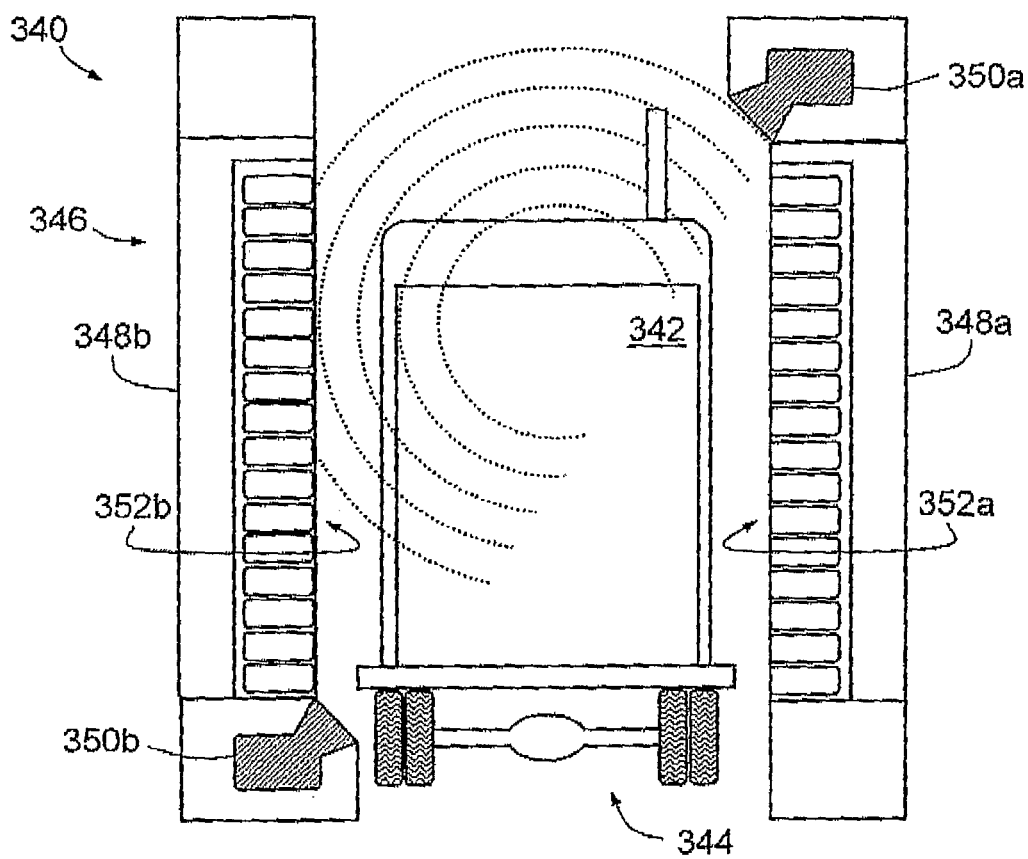
FIG. 31 is a schematic view of a cargo screening system according to another embodiment of the present invention, with a truck carrying a load to be screened.

FIG. 31 is a schematic view of an alternative embodiment, a double sided screening system 340 (depicted with an item 342 under inspection, in this example in the form of a shipping container on the tray of a truck 344)

Screening system 340 includes a screening portal 346 (comprising first and second side walls 348a, 348b), through the item 342 to be inspected is passed. First wall 348a includes a first radiation source 350a, located to bath the item 342 under inspection in a fan of radiation generally from above. Second wall 348b includes a second radiation source 350b, located to bath the item 342 under inspection in a fan of radiation generally from below. Radiation sources 350a, 350b may comprise gamma-ray radiation sources, or a gamma-ray source and either a neutron source or X-ray source. In this example, each radiation source 350a, 350b comprises a collimated 1.0 Curie Cesium 137 (Cs 137) source, which emits 661.6 keV gamma rays, or a collimated Cobalt 60 (Co 60) source, which emits 1173.2 keV gamma rays and 1332.6 keV gamma rays.

Screening system 340 includes first and second two detector arrays 352a, 352b, located in first and second portal walls 348a, 348b respectively and arranged to detect both back-scattered radiation and transmission radiation from radiation sources 350a, 350b. Each of detector arrays 352a, 352b comprises 256 Sodium Iodide (NaI) scintillator detectors; each of these NaI scintillator detectors has a forward face of 1.125 inches square (28.6 mm square) and is connected to a respective photomultiplier tube (not shown). Signals from the photomultiplier tubes are input into detection electronics (not shown) that process the amplified signals according to the signal processing method for pulse pile-up recovery of the embodiment of FIG. 9.

Each detector registers the radiation flux that interacts with it after having passed through, or been reflected back from, container 342. As truck 344 passes through portal 346, an image is built up in slices; the image may be a transmission image or a back-scattering image, where each detector in detector arrays 352a, 352b provides one pixel of vertical resolution.

Sodium Iodine (NaI), as the scintillation material of the detectors of detector arrays 352a, 352b, has reasonably good energy resolution and stopping power, and is relatively inexpensive, but has a scintillation light output with a decay time of 240 ns. Owing to the length of this decay time, detector systems based on NaI scintillators may have a dead time of around 5 μs. If an energy window is placed around the energy of the principal gamma ray emitted by a radiation source (such as a window of 661.6±15% for Cs 137 source) to exclude background and improve signal-to-noise-ratio, pile-up may cause two events to be discarded because they fall outside that window.

Figure 32:
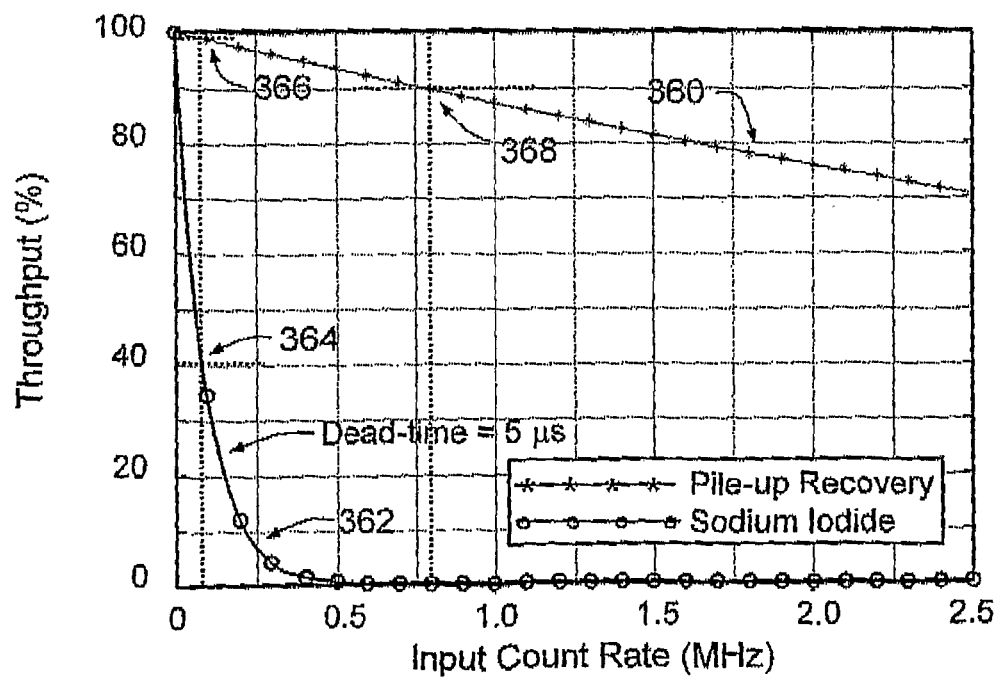
FIG. 32 is a plot of percentage throughput as a function of input count rate calculated for the cargo screening system of FIG. 31 assuming a dead-time of 5 µs, and of the calculated performance of the signal processing method for pulse pile-up recovery of an embodiment of the present invention.

FIG. 32 is a plot of the calculated detector percentage throughput, that is, of incoming radiation events that are not affected by pulse pile-up, versus input count rate, for both screening system 340 (plotted as stars at 360) and for screening system 340 modified to include conventional data processing (plotted as circles at 362). In both cases the dead-time of the NaI detectors of screening system 340 is assumed to be 5 μs.

It is apparent that, at an input count-rate of 80 kHz, approximately 60% of all events impinging on the detectors are lost owing to pulse pile-up (cf. point 364) when conventional data processing is employed. However, screening system 340 has a throughput of greater than 98% (cf. point 366). Consequently, if a container 342 is scanned at the same input count rate using screening system 340, that scan could be completed in 45% of the time required using conventional data processing; that is, it is expected that a 120 s scan could be completed in about 54 s.

Furthermore, screening system 340 can operate at significantly higher count rates than is possible with conventional systems with, for example, NaI scintillation detectors. Referring to FIG. 23, at an input count rate of 800 kHz the input events lost to pulse pile-up in screening system 340 amount to only about 10% (cf. point 368). Consequently it would be possible to increase a scan with a 80 kHz input count rate to use a 800 kHz input count rate, reducing the time required to scan container 342 by a factor of 10. This is at a loss of some throughput compared to an 80 kHz input count rate (viz, from ~98% to ~90%), but is still an improvement of a factor of 1.45 over the 40% throughput from conventional processing at 80 kHz (as 90%/40%=1.45). Hence, a total increase in scanning speed of approximately 1.45×10=14.5, or at least an order of magnitude, might be achieved by employing screening system 340 at the higher count rate.

Modifications within the scope of the invention may be readily effected by those skilled in the art. It is to be understood, therefore, that this invention is not limited to the particular embodiments described by way of example hereinabove.

In the claims that follow and in the preceding description of the invention, except where the context requires otherwise owing to express language or necessary implication, the word "comprise" or variations such as "comprises" or "comprising" is used in an inclusive sense, i.e. to specify the presence of the stated features but not to preclude the presence or addition of further features in various embodiments of the invention.

Further, any reference herein to prior art is not intended to imply that such prior art forms or formed a part of the common general knowledge.

The invention claimed is:

1. A screening method, comprising:
providing a subject for screening with excitation radiation;
collecting detector output data from a radiation detector that receives radiation from the subject; and
resolving individual signals in the detector output data by:
obtaining or expressing the detector output data as a digital series,
obtaining or determining a signal form of the individual signals present in the output data,
forming a transformed signal form by transforming the signal form according to a mathematical transform,
forming a transformed series by transforming the digital series according to the mathematical transform, said transformed series comprising transformed signals,
evaluating a function of at least the transformed series and the transformed signal form and thereby providing a function output,
modelling the function output according to a model,
determining at least one parameter of the function output based on the model, and
determining a parameter of the individual signals from the determined parameter of the function output.

2. A screening apparatus, comprising:
a radiation source configured to provide a subject to be screened with radiation;
a radiation detector configured to detect radiation emitted by the subject, and to output detector data in response to the radiation; and
a processor configured to receive the detector data as a digital series, and programmed with instructions that:
obtain or determine a signal form of individual signals present in the data,
form a transformed signal form by transforming the signal form according to a mathematical transform,
form a transformed series by transforming the digital series according to the mathematical transform, said transformed series comprising transformed signals,
evaluate a function of at least the transformed series and the transformed signal form and thereby provide a function output,
model the function output according to a model,
determine at least one parameter of the function output based on the model, and
determine a parameter of the individual signals from the determined parameter of the function output.

3. A method for screening for a chemical element in an object or objects, comprising:
collecting detector output data from a radiation detector of a screening apparatus;
resolving individual signals in the detector output data by:
obtaining or expressing the detector output data as a digital series,
obtaining or determining a signal form of individual signals present in the detector output data,
forming a transformed signal form by transforming the signal form according to a mathematical transform,
forming a transformed series by transforming the digital series according to the mathematical transform, said transformed series comprising transformed signals,
evaluating a function of at least the transformed series and the transformed signal form and thereby providing a function output,
modelling the function output according to a model,
determining at least one parameter of the function output based on the model, and
determining a parameter of the individual signals from the at least one determined parameter of the function output;
determining a quantity of the chemical element from at least those of the signals arising from instances of the chemical element in the object or objects.

4. The screening method of claim 1, wherein a screening time of screening the subject is reduced, wherein a dwell time of screening the subject is reduced, and wherein a resolution of screening the subject is improved and/or a throughput of screening the subject increases.

5. The screening method of claim 1, further comprising forming the model based on at least a temporal position or an amplitude of the individual signals.

6. The screening method of claim 1, wherein determining the parameter of the individual signals comprises determining an amplitude or an energy of the signals based on the model, the amplitude or the energy being indicative of a radiation event.

7. The screening method of claim 1, wherein the radiation received from the subject comprises gamma-rays of 75 kHz or more.

8. The screening method of claim 1, wherein a throughput of resolving the signals is substantially greater than 90% for the detector output data at an input count rat of 50 kHz or between 25 kHz and 250 kHz, or the throughput is substantially greater than 95% for the detector output data at another input count rat of 25 kHz or between 25 kHz and 250 kHz.

9. The screening method of claim 1, wherein a throughput of resolving the signals is substantially greater than 50% for the detector output data at an input count rat between 250 kHz and 2500 kHz, or the throughput is substantially greater than 80% for the detector output data at another input count rat of 250 kHz.

10. The screening apparatus of claim 2, wherein a screening time of screening the subject is reduced, wherein a dwell time of screening the subject is reduced, and wherein a resolution of screening the subject is improved and/or a throughput of screening the subject increases.

11. The screening apparatus of claim 2, wherein the processor is further programmed with instructions that form the model based on the digital series and as a function of at least the signal form, a temporal position of the signals or an amplitude of the signals.

12. The screening apparatus of claim 2, wherein the processor is further programmed with instructions that determine an amplitude or an energy of the signals based on the model, the amplitude or the energy being indicative of a radiation event.

13. The screening apparatus of claim 2, wherein the radiation detector comprises a detector configured to detect gamma-rays of substantially 75 kHz or more.

14. The screening apparatus of claim 2, wherein a throughput of the processor is substantially greater than 90% for the detector output data at an input count rat of 50 kHz or between 25 kHz and 250 kHz, or the throughput is substantially greater than 95% for the detector output data at another input count rat of 25 kHz or between 25 kHz and 250 kHz.

15. The screening apparatus of claim 2, wherein a throughput of the processor is substantially greater than 50% for the detector output data at an input count rat between 250 kHz and 2500 kHz, or the throughput is substantially greater than 80% for the detector output data at another input count rat of 250 kHz.

16. The method of claim 3, wherein a screening time of screening for the chemical element is reduced, wherein a dwell time of screening for the chemical element is reduced, and wherein a resolution of screening for the chemical element is improved and/or a throughput of screening for the chemical element increases.

17. The method of claim 3, further comprising forming the model based on the digital series and as a function of at least the signal form, a temporal position of the signals or an amplitude of the signals.

18. The method of claim 3, wherein determining the parameter of the individual signals comprises determining an amplitude or an energy of the signals based on the model, the amplitude or the energy being indicative of a radiation event.

19. The method of claim 3, wherein the radiation detector comprises a detector configured to detect gamma-rays of 75 kHz or more.

20. The method of claim 3, wherein a throughput of resolving individual signals is substantially greater than 90% for the detector output data at an input count rat of 50 kHz or between 25 kHz and 250 kHz or substantially greater than 95% for the detector output data at an input count rat of 25 kHz or between 25 kHz and 250 kHz.

* * * * *